United States Patent
Mori

(10) Patent No.: US 10,144,263 B2
(45) Date of Patent: Dec. 4, 2018

(54) VEHICLE-HEIGHT ADJUSTING DEVICE

(71) Applicant: AISIN SEIKI KABUSHIKI KAISHA, Kariya-shi, Aichi-ken (JP)

(72) Inventor: Hiroya Mori, Toyota (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 0 days.

(21) Appl. No.: 15/481,647

(22) Filed: Apr. 7, 2017

(65) Prior Publication Data

US 2017/0349023 A1 Dec. 7, 2017

(30) Foreign Application Priority Data

Jun. 3, 2016 (JP) ................. 2016-111628

(51) Int. Cl.
*B60G 17/016* (2006.01)
*B60G 17/018* (2006.01)
*B60G 17/015* (2006.01)

(52) U.S. Cl.
CPC ....... *B60G 17/0162* (2013.01); *B60G 17/018* (2013.01); *B60G 17/015* (2013.01); *B60G 17/016* (2013.01); *B60G 2400/252* (2013.01); *B60G 2500/30* (2013.01)

(58) Field of Classification Search
CPC .............. B60G 17/0162; B60G 17/018; B60G 2500/30; B60G 2400/252; B60G 17/015; B60G 17/016

See application file for complete search history.

(56) References Cited

U.S. PATENT DOCUMENTS

| | | | |
|---|---|---|---|
| 2005/0212225 A1 | 9/2005 | Suzuki et al. | |
| 2008/0119984 A1* | 5/2008 | Hrovat | B60G 17/0162 701/38 |
| 2014/0195112 A1* | 7/2014 | Lu | B60G 17/015 701/37 |
| 2014/0195113 A1* | 7/2014 | Lu | B60G 17/0165 701/37 |
| 2015/0145200 A1* | 5/2015 | Hikichi | G03G 15/5004 271/215 |

(Continued)

FOREIGN PATENT DOCUMENTS

| | | |
|---|---|---|
| JP | 4-019214 A | 1/1992 |
| JP | 04-050014 A | 2/1992 |
| JP | 2005-271718 A | 10/2005 |

*Primary Examiner* — Darlene P Condra
(74) *Attorney, Agent, or Firm* — Sughrue Mion, PLLC

(57) ABSTRACT

A vehicle-height adjusting device includes: a vehicle-height adjusting unit that adjusts a vehicle height through extension and contraction thereof, which is disposed between each wheel and a vehicle body of a vehicle; a control unit that controls actuation of the vehicle-height adjusting unit; an obstacle detecting unit that detects an obstacle that is present within a predetermined range from the vehicle; a steering-angle detecting unit that detects an steering angle of the vehicle; and an identification unit that identifies a portion of the vehicle that overlaps the obstacle, based on a detection result by the obstacle detecting unit and a detection result by the steering-angle detecting unit, in which the control unit controls at least one of the vehicle-height adjusting unit, based on an identification result of the identification unit.

4 Claims, 12 Drawing Sheets

(56) References Cited

U.S. PATENT DOCUMENTS

| | | | |
|---|---|---|---|
| 2015/0145220 A1* | 5/2015 | Yellambalase | B60G 17/019 |
| | | | 280/5.514 |
| 2017/0087951 A1* | 3/2017 | Hrovat | B60G 17/0165 |
| 2017/0113508 A1* | 4/2017 | Unger | B60G 13/14 |
| 2017/0129298 A1* | 5/2017 | Lu | B60G 17/015 |
| 2017/0129434 A1* | 5/2017 | Sun | B60R 21/013 |
| 2017/0186319 A1* | 6/2017 | Tsushima | G08G 1/16 |
| 2017/0352270 A1* | 12/2017 | Tanaka | G08G 1/16 |

* cited by examiner

VEHICLE-HEIGHT ADJUSTING DEVICE

CROSS REFERENCE TO RELATED APPLICATIONS

This application is based on and claims priority under 35 U.S.C. § 119 to Japanese Patent Application 2016-111628, filed on Jun. 3, 2016, the entire contents of which are incorporated herein by reference.

TECHNICAL FIELD

This disclosure relates to a vehicle-height adjusting device.

BACKGROUND DISCUSSION

JP4-19214A (Reference 1) discloses a suspension device for a vehicle that adjusts a vehicle height, depending on a state in front of the vehicle. The suspension device for a vehicle in Reference 1 includes an actuator that is capable of extending a suspension mounted between wheels and a vehicle body. In a case where an obstacle is detected in front of the vehicle, the actuator is controlled to extend the suspension before the vehicle passes over the obstacle such that the vehicle body is biased upward. The upward bias of the vehicle body causes the vehicle body to be lifted when the vehicle passes over the obstacle. In this manner, the vehicle avoids the obstacle.

In Reference 1, in a case where an obstacle is detected, the extension of the suspension and the upward bias of the vehicle body causes the vehicle to avoid the obstacle. In other words, since the actuator is controlled with only information related to an approach of the obstacle, there is a concern that the control may not be appropriate regarding a driving situation or the like of the vehicle.

Thus, a need exists for a vehicle-height adjusting device which is not susceptible to the drawback mentioned above.

SUMMARY

A first aspect of this disclosure is directed to a vehicle-height adjusting device including: a vehicle-height adjusting unit that adjusts a vehicle height through extension and contraction thereof, which is disposed between each wheel and a vehicle body of a vehicle; a control unit that controls actuation of the vehicle-height adjusting unit; an obstacle detecting unit that detects an obstacle that is present within a predetermined range from the vehicle; a steering-angle detecting unit that detects an steering angle of the vehicle; and an identification unit that identifies a portion of the vehicle that overlaps the obstacle, based on a detection result by the obstacle detecting unit and a detection result by the steering-angle detecting unit. The control unit controls at least one of the vehicle-height adjusting units, based on an identification result of the identification unit.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment of a vehicle-height adjusting device 1 disclosed here will be described.

Figure 1:
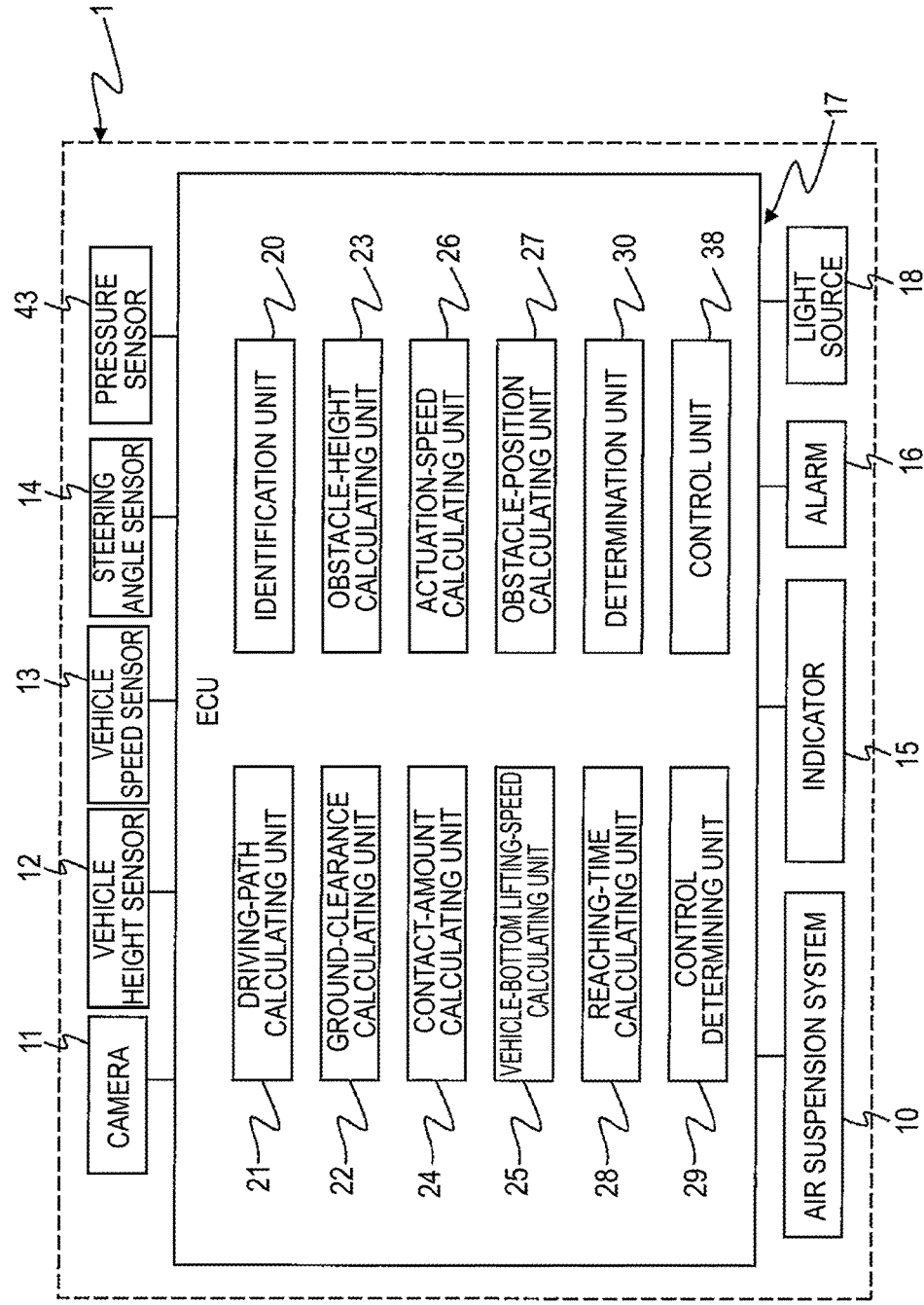
FIG. 1 is a diagram illustrating a configuration of a vehicle-height adjusting device according to an embodiment disclosed here.

FIG. 1 illustrates a configuration of the vehicle-height adjusting device 1. As illustrated in FIG. 1, the vehicle-height adjusting device 1 includes an air suspension system 10 provided with air springs 40a to 40d (vehicle-height adjusting unit in FIG. 2), a camera 11 (obstacle detecting unit), a vehicle height sensor 12 (displacement-amount detecting unit), a wheel speed sensor 13 (vehicle-speed detecting unit), a steering angle sensor 14 (steering-angle detecting unit), a pressure sensor 43 (pressure detecting unit), an indicator 15 (notifying unit), an alarm 16 (notifying unit) and an electronic control unit (control unit, hereinafter, referred to as an ECU) 17, and a light source 18 (obstacle detecting unit).

Figure 2:
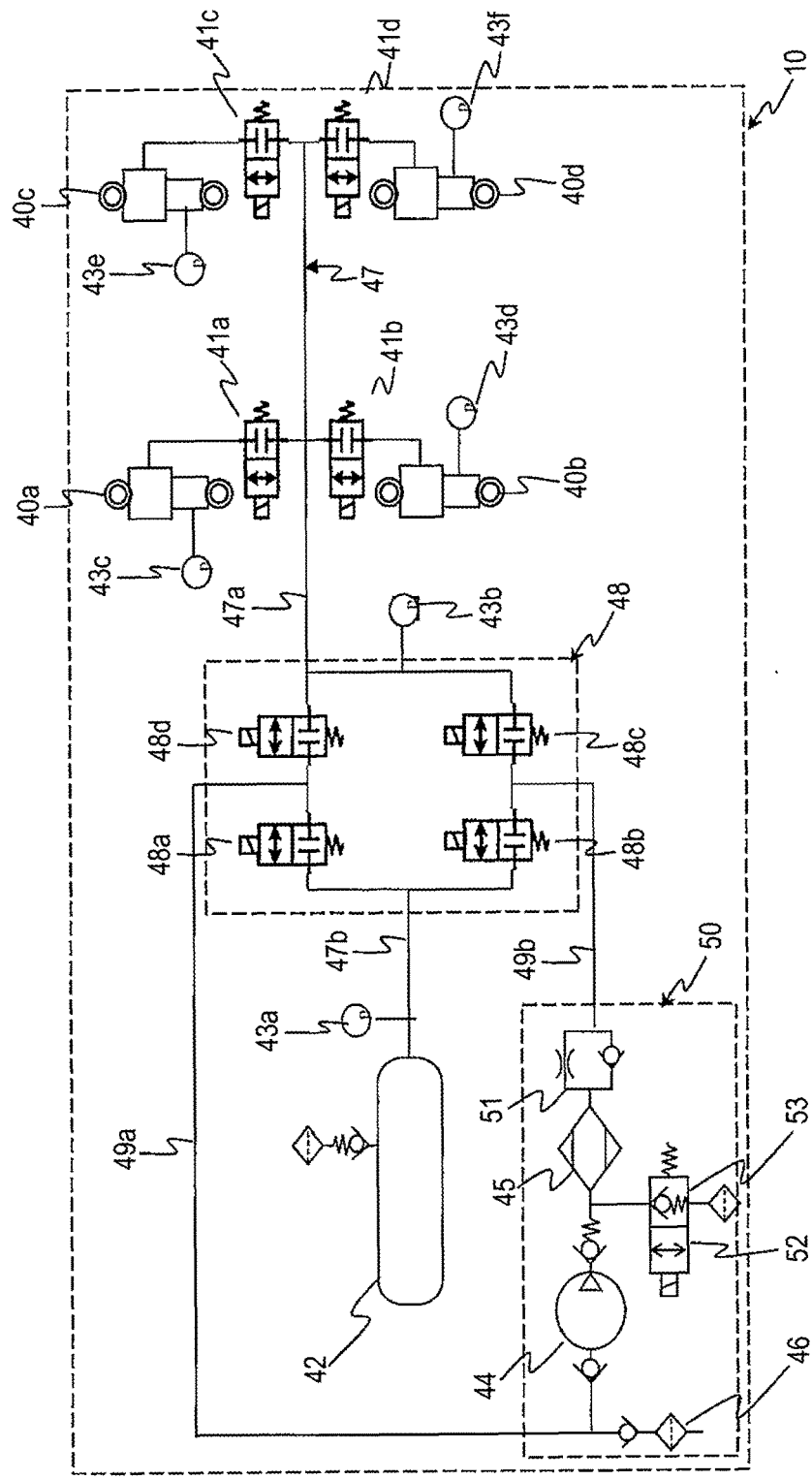
FIG. 2 is a diagram illustrating a configuration of an air suspension system during non-actuation according to the embodiment disclosed here.

FIG. 2 is a diagram illustrating a configuration of the air suspension system 10 during non-actuation. As illustrated in FIG. 2, the air suspension system 10 is provided with the air springs 40a to 40d, vehicle-height adjusting valves 41a to 41d, a pressure tank 42, a circuit valve block 48, a compressor unit 50, a main flow path 47, a compressor inflow path 49a, and a compressor outflow path 49b.

The air springs 40a to 40d are connected to the wheels and a vehicle body of a vehicle (not illustrated). The air spring 40a for a front right wheel, the air spring 40b for a front left wheel, the air spring 40c for a rear right wheel, and the air spring 40d for a rear left wheel (hereinafter, in some cases, simply referred to as an "air spring 40" in a case where the air springs are not distinguished from each other) function as the vehicle-height adjusting unit that adjusts a vehicle height through extension and contraction of the springs. The air spring 40 changes a suspension state of the vehicle body of the vehicle in response to supply and discharge of a working fluid (for example, air). In addition, the air spring 40 has a function of absorbing vibration of the vehicle due to elasticity of compressed air sealed in the air spring 40.

It is possible to use the air spring 40 having a known structure. Since elasticity of the air is used, the air spring 40 is likely to absorb finer vibration than a metal spring. In addition, control of air pressure causes the vehicle height to be constantly maintained, or makes it possible to adjust the vehicle height to a predetermined height or to change a spring constant into a predetermined value.

The air springs 40a, 40b, 40c and 40d are connected to the main flow path 47 through which the working fluid flows via the vehicle-height adjusting valves 41a, 41b, 41c, and 41d, respectively. The main flow path 47 is connected to the air springs 40 and the pressure tank 42 and is a flow path for supplying air stored in the pressure tank 42 to the air springs 40 or discharging the air in the air springs 40 to the pressure tank 42. Thus the main flow path includes a communicating main flow path 47a and a tank-connecting main flow path 47b. In some cases, the vehicle-height adjusting valves 41a, 41b, 41c, and 41d are simply referred to as a "vehicle-height adjusting valve 41" in a case where the vehicle-height adjusting valves are not distinguished from each other. In addition, in the embodiment, both of the air springs 40 and the vehicle-height adjusting valves 41 are referred to as the vehicle-height adjusting unit in some cases.

It is possible to use the same type of on-off valves as the vehicle-height adjusting valves 41 (41a, 41b, 41c, and 41d), and the valves have, for example, a solenoid and a spring that are controlled to be ON/OFF. As any vehicle-height adjusting valve 41, it is possible to use a normally-closed solenoid control value that is in a closed state in a case where the solenoid is in the non-energized state. Hence, in the non-energized state of the solenoids of the vehicle-height adjusting valves 41, the communication between the air springs 40a to 40d and the communicating main flow path 47a is blocked by the vehicle-height adjusting valves 41, and the air springs 40a to 40d and the communicating main flow path 47a communicate with each other by the vehicle-height adjusting valves 41 when the solenoids are energized.

The communicating main flow path 47a is connected to the pressure tank 42 (a supply source of the working fluid) via the circuit valve block 48 and the tank-connecting main flow path 47b. The circuit valve block 48 is connected to the compressor unit 50 on the inflow side thereof via the compressor inflow path 49a. In addition, the circuit valve block 48 is connected to the compressor unit 50 on the outflow side thereof via the compressor outflow path 49b.

The circuit valve block 48 is configured as a valve-body block including a plurality of valves, for example, four on-off valves, and thus controls the communication between the compressor unit 50, the air springs 40, and the pressure tank 42. Specifically, the circuit valve block 48 is configured of a first on-off valve 48a, a second on-off valve 48b, a third on-off valve 48c, and a fourth on-off valve 48d.

The first on-off valve 48a and the second on-off valve 48b have one end side that is connected to the pressure tank 42 via the tank-connecting main flow path 47b (main flow path 47). The third on-off valve 48c has one end side that is connected to the compressor unit 50 on the outflow side thereof via the compressor outflow path 49b and is connected to the other end side of the second on-off valve 48b.

In addition, the other end side of the third on-off valve 48c is connected to the air springs 40 side (vehicle-height adjusting unit side) via the communicating main flow path 47a. The fourth on-off valve 48d has one end side that is connected to the compressor unit 50 on the inflow side thereof via the compressor inflow path 49a and is connected to the other end side of the first on-off valve 48a. In addition, the other end side of the fourth on-off valve 48d is connected to the air springs 40 side (vehicle-height adjusting unit side) via the communicating main flow path 47a.

It is possible to use the same type of on-off valves as the first on-off valve 48a, the second on-off valve 48b, the third on-off valve 48c, and the fourth on-off valve 48d which are included in the circuit valve block 48, and the valves have, for example, a solenoid and a spring that are controlled to be ON/OFF. As any on-off valve, it is possible to use the normally-closed solenoid control value that is in a closed state in a case where the solenoid is in the non-energized state.

The pressure tank 42, in which air having predetermined pressure is stored, for example, is made of metal or resin, and has a capacity and pressure resistance to sufficiently withstand pressure generated in a flow path system during both of vehicle-height adjusting control and non-control by the air springs 40.

The compressor unit 50 is mainly configured to include compressor and motor 44, a dryer 45, and a throttle mechanism 51. FIG. 2 illustrates a case where a relief valve 52, a check valve 53, a filter 46, or the like is included.

The compressor unit 50 actuates the compressor and motor 44 so as to perform pressure-feeding of the working fluid in a case where a pressure difference between the pressure tank 42 side and the air springs 40 side is lower than or equal to a predetermined value (value set through tests or the like in advance) during vehicle-height lifting control, or in a case where the working fluid is drawn up (returns) to the pressure tank 42 from the air springs 40 side during vehicle-height lowering control.

The air suspension system 10 of the embodiment includes a first pressure sensor 43a, a second pressure sensor 43b, an FR pressure sensor 43c, an FL pressure sensor 43d, an RR pressure sensor 43e, and an RL pressure sensor 43f. In some cases, the first pressure sensor 43a, the second pressure sensor 43b, the FR pressure sensor 43c, the FL pressure sensor 43d, the RR pressure sensor 43e, and the RL pressure sensor 43f are simply referred to as the "pressure sensor 43" in a case where the pressure sensors are not distinguished with each other.

The pressure sensor 43 is a known sensor and thus detailed description thereof is omitted. Pressure (pressure of detection target object, that is, pneumatic pressure in the embodiment) that is introduced through a hole provided in a housing is transmitted to a detection element via a sealed liquid. Then, a strain gauge provided on the detection element changes, a signal generated in response to the change is transmitted to an external signal processing circuit, and thereby the pressure of the detection target object is detected.

FIG. 2 illustrates a case where the circuit valve block 48 (valve-body block) includes the first pressure sensor 43a that detects pressure on the pressure tank 42 side, and the second pressure sensor 43b that detects pressure on the air springs 40 side (vehicle-height adjusting unit side).

The circuit valve block 48 is made of, for example, metal or resin, is provided with channels inside for connecting the first on-off valve 48a, the second on-off valve 48b, the third on-off valve 48c, and the fourth on-off valve 48d as described above. The first pressure sensor 43a is connected to a channel so as to connect one end of the first on-off valve 48a or one end of the second on-off valve 48b to the tank-connecting main flow path 47b (main flow path 47) (in the case in FIG. 2, connected to a channel extending from the one end of the first on-off valve 48a). In addition, the second pressure sensor 43b is connected to a channel so as to connect one end of the third on-off valve 48c or one end of the fourth on-off valve 48d to the communicating main flow path 47a (main flow path 47) (in the case in FIG. 2, connected to a channel extending from the one end of the third on-off valve 48c).

As described above, the first pressure sensor 43a is capable of detecting pressure (static pressure or dynamic pressure) on the upstream side of the circuit valve block 48 (for example, the pressure tank 42 side), and the second pressure sensor 43b is capable of detecting pressure (static pressure or dynamic pressure) on the downstream side of the circuit valve block 48 (for example, the air springs 40 side). As will be described below, the working fluid is circulated from the pressure tank 42 side to the air springs 40 side due to a pressure difference between the pressure on the pressure tank 42 side and the pressure on the air spring 40 side, and thereby it is possible to adjust the vehicle height. In other words, since the working fluid for the vehicle-height adjustment is not sufficiently circulated in a case of a small pressure difference, it is necessary to drive the compressor unit 50.

In addition, the FR pressure sensor 43c, the FL pressure sensor 48d, the RR pressure sensor 43e, and the RL pressure sensor 43f are disposed on the air springs 40a, 40b, 40c and 40d, respectively, and thus are capable of detecting pressure (static pressure or dynamic pressure) in the air springs 40. As will be described below, it is possible to calculate a speed of the vehicle height adjustment in consideration of a pressure difference between the pressures in the air springs 40, in addition to the pressure difference (differential pressure) between the pressure on the pressure tank 42 side and the pressure on the air springs 40 side.

Note that the air suspension system 10 of the embodiment disclosed here is a closed type of system that performs the vehicle height adjustment by causing the working fluid (air sealed from the beginning) in a route to move between the pressure tank 42 side and the air springs 40 side. Hence, basically, it is possible to consider that outside air does not enter the system and thus there is no change in an environment such as no change in humidity. Hence, in a case of the closed type of system, it is possible to omit the dryer 45 or the throttle mechanism 51.

However, the working fluid (air) in the system leaks to the outside due to some causes in some cases. In such a case, the atmosphere (outside air) is guided from the outside via the filter 46 and the system is refilled with the working fluid.

In this case, the atmosphere (outside air) contains water (moisture) that causes damage to components of the air suspension system 10 in some cases. Therefore, the air suspension system 10 illustrated in FIG. 2 includes the dryer 45 that is provided on the downstream side of the compressor and motor 44 and removes a predetermined amount of the moisture of the guided atmosphere, or the throttle mechanism 51 for adjusting a passing speed of the atmosphere in the dryer 45.

In order to reduce the pressure in the air suspension system 10 in a case where the pressure in the air suspension system exceeds a limit pressure due to some causes, the compressor unit 50 is provided with the relief valve 52. The relief valve 52 has, for example, a solenoid and a spring that are controlled to be ON/OFF, and thus as the relief valve, it is possible to use the normally-closed solenoid control value that is in a closed state in a case where the solenoid is in the non-energized state.

The relief valve 52 of the embodiment includes the check valve 53 that does not maintain the closed state during the non-energizing in every case, but allows the working fluid to circulate in an atmosphere-open direction in a case where the pressure in the air suspension system 10 exceeds the limit pressure (pressure set through tests or the like in advance). For example, in a case where the pressure in the air suspension system 10 exceeds the limit pressure due to some causes, the relief valve enters an opened state against a bias force of the check valve 53, and thus pressure reduction is automatically performed so as to reduce the pressure to pressure lower than or equal to the limit pressure.

Note that the relief valve 52 is capable of performing transition to the opened state in response to a control signal from a control unit, and thus it is possible to perform pressure reduction on the pressure inside the air suspension system 10 regardless of the limit pressure. In addition, the compressor and motor 44 functions as a supply source that supplies the working fluid to the air springs 40 side.

The vehicle-height adjusting valves 41, the pressure sensors 43, the on-off valves 48a to 48d of the circuit valve block 48, and the compressor unit 50 of the air suspension system 10 are electrically connected to the ECU 17.

In addition, as illustrated in FIG. 1, the camera 11, the sensors 12 to 14, the indicator 15, the alarm 16, and the light source 18 are also connected to the ECU 17. Detection results by the camera 11 and the sensors 12 to 14 and 43 are output to the ECU 17. In addition, the alarm 16 and the indicator 15 and the light source 18 operate in response to a command from the ECU 17.

Figure 3:
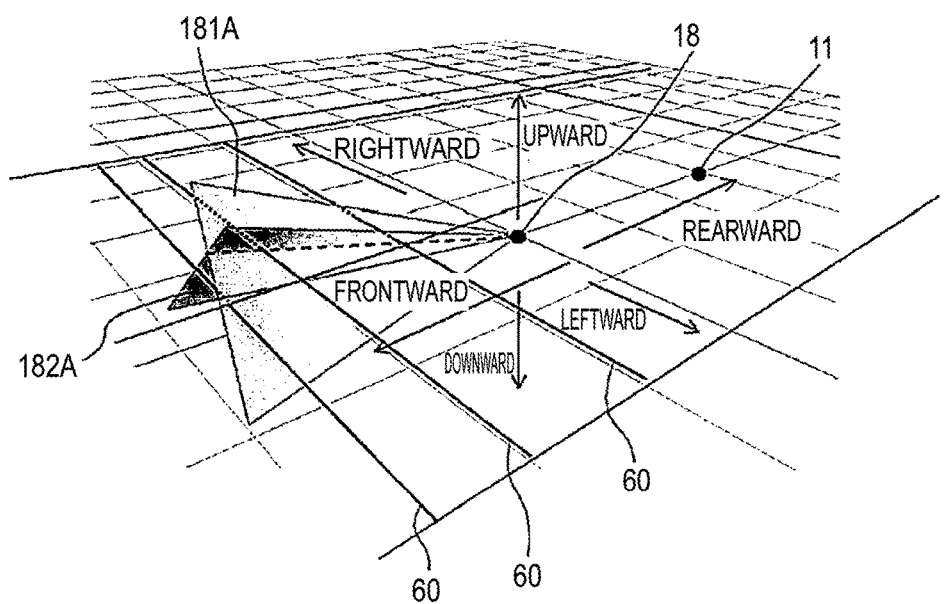
FIG. 3 is a diagram illustrating disposition of a camera and a light source according to the embodiment disclosed here.

FIG. 3 illustrates a diagram of disposition of the camera 11 and the light source 18. The camera 11 and the light source 18 are provided to detect an obstacle that is present within a predetermined range from the vehicle, that is, in the embodiment, within a range of 20 m from the vehicle. As illustrated in FIG. 3, the light source 18 is to detect the obstacle, and thus two separate light sources 18 (a first light source 181 and a second light source 182) are provided in a front portion of the vehicle (not illustrated), for example, on front grills. Detailed description of a configuration of the light sources 18 is omitted because the light source has a known configuration. The light sources are point light sources, respectively, emit plane shaped irradiation lights (first irradiation light 181A and second irradiation light 182A) that are diffused to form planes in front of the vehicle, respectively, and irradiation is performed with the beams of irradiation lights 181A and 182A at a predetermined angle inclined from a perpendicular direction to a horizontal direction.

The light sources 18 emit separate planes of irradiation light, respectively, and planes formed by the irradiation lights 181A and 182A are set to intersect with each other, respectively. When a linear obstacle 60 is irradiated with the plane-shaped irradiation lights 181A and 182A, the obstacle appears as a bright spot because the irradiation lights 181A and 182A have the plane shape and the intersection point of the irradiation lights 181A and 182A with the obstacle 60 has a point shape.

The camera 11 is to detect the obstacle, and thus the camera is provided on the rear side from the light sources 18 on the roof of the vehicle (not illustrated) so as to image the front side of the vehicle. The camera 11 is provided with an optical filter that selectively transmits the same wavelength as that of the irradiation lights 181A and 182A of the light source 18 and is disposed on an incident side, the bright spot of the obstacle 60 irradiated with the light sources 18 enters a field of view, and the bright spot is set to be recognized. In addition, the plane formed by the first irradiation light 181A and the plane formed by the second irradiation light 182A intersect with each other in the field of view.

An image output from the camera 11 is digitized, is input to an image processing unit (not illustrated) of the ECU 17, is subjected to image processing through various types of filters or the like, and is converted into an image such that it is possible to recognize the position of the bright spot in the image. The position of the bright spot is determined from a positional relationship between the irradiation lights 181A and 182A and the obstacle 60, and analysis of the position or motion of the bright spot in the image is performed with a distance or the like from the light sources 18 to the obstacle 60 from the positions of the bright spots and intervals therebetween in the captured two-dimensional image such that a height of the obstacle 60 or a distance to the obstacle 60 is calculated.

The vehicle height sensor 12 detects a vertical displacement amount between the vehicle (not illustrated) and a suspension arm, that is, detects displacement amounts of the air springs 40, and is provided with respect to the wheels. The vehicle height sensor 12 is a known sensor, and thus detailed description of a structure thereof is omitted. The vehicle height sensor is configured to include a vehicle-height-sensor-12 main body and a link arm and the vehicle-height-sensor-12 main body is fixed to the vehicle body.

An operating arm that rotates within a vertical plane extends from the vehicle-height-sensor-12 main body. The operating arm is connected to the link arm on the upper end side via a joint, and the lower end side of the link arm is connected to a connection member fixed to the suspension arm.

In other words, the vehicle-height-sensor-12 main body is connected to the suspension arm of the vehicle via the operating arm and the link arm. When the vehicle height changes, the suspension arm is displaced from a normal position in a vertical direction and thus the link arm is caused to be displaced in the vertical direction. When the link arm is displaced in the vertical direction, the operating arm rotates. The vehicle-height-sensor-12 main body detects the rotation of the operating arm, thereby detecting the change in the vehicle height.

The wheel speed sensor 13 detects a vehicle speed of the vehicle and is provided on the wheels. The wheel speed sensor 13 is a known sensor, and thus detailed description of a structure thereof is omitted. The wheel speed sensor is provided with a rotor on the wheel side, which has a slit or a gear surface that changes magnetic flux density, causes a non-contact magnetic flux generator to generate magnetic flux to be close to and face the rotor, and is provided with a sensor on the vehicle body side as the non-rotation side, which has a detecting unit that detects a change in the magnetic flux due to a rotating state of the rotor. The magnetic flux changes depending on the rotation of the rotor, and thereby the wheel speed sensor detects the rotating state of the rotor. The ECU 17 calculates a rotating speed of the wheels from the rotating state of the rotor detected by the wheel speed sensor 13, and calculates a speed of the vehicle from the calculation result.

The steering angle sensor 14 detects a steering angle of the vehicle and is provided inside a steering wheel of the vehicle. The steering angle sensor 14 is a known sensor, and thus detailed description of a structure thereof is omitted.

The steering angle sensor is provided with a rotating member formed of a magnet that alternately has N-pole regions with N polarity and S-pole regions with S polarity around a rotating center, and a magnetic-field detecting unit that is provided to face an outer side of the rotating member in a radial direction and is capable of detecting the magnitudes of components of a magnetic field in at least two directions of a direction parallel to the radial direction of the rotating member and a direction parallel to a rotating direction of the rotating member. The magnetic-field detecting unit detects the magnitudes of the components of the magnetic field in the two directions of the radial direction of the rotating member and the rotating direction of the rotating member which is orthogonal to the radial direction in the magnetic field generated around the rotating member. It is possible to obtain a rotating angle of the rotating member from a ratio of the magnitudes of the components of the magnetic field in the two directions which are detected by the magnetic-field detecting unit.

The indicator 15 and the alarm 16 notify the driver of the vehicle that it is not possible to avoid the obstacle by the control of the air springs 40. The indicator 15 is a lamp provided in an indicator panel in the vehicle interior, particularly, of the driver seat, and shows a state of the vehicle. The indicator 15 turns on the light in a case where an obstacle that is unavoidable by vehicle-height adjusting control is present in front of the vehicle.

The alarm 16 is provided in the vehicle interior and generates a warning sound, thereby notifying the driver abnormality. Similar to the indicator 15, the alarm 16 generates the warning sound in a case where an obstacle that is unavoidable by vehicle-height adjusting control is present in front of the vehicle.

The ECU 17 includes an identification unit 20 that identifies a portion of the vehicle that overlaps the obstacle, a driving-path calculating unit 21 that calculates a driving path of the vehicle, a ground-clearance calculating unit 22 that calculates ground clearance of a bottom of the vehicle in the portion of the vehicle that overlaps the obstacle, an obstacle-height calculating unit 23 that calculates a height of the obstacle, a contact-amount calculating unit 24 that calculates a contact amount between the vehicle and the obstacle in the portion of the vehicle that overlaps the obstacle, a vehicle-bottom lifting-speed calculating unit 25 that calculates a lifting speed of the bottom of the vehicle in the portion of the vehicle that overlaps the obstacle, an actuation-speed calculating unit 26 that calculates a speed depending on the extension and contraction of the air springs 40, an obstacle-position calculating unit 27 that calculates a relative position of the obstacle from the vehicle, a reaching-time calculating unit 28 that calculates time taken for the foremost portion of the vehicle to reach the obstacle, a control determining unit 29 that determines a control method of the air springs 40, a determination unit 30 that determines whether or not it is possible to avoid contact between the vehicle and the obstacle, and a control unit 38 that controls the air springs 40.

The vehicle-height adjusting device 1 having such a configuration performs control of the vehicle height adjustment on a vehicle-height adjusting unit (air springs, vehicle-height adjusting valve, or the like) by the ECU 17. The ECU 17 performs opening/closing control of the vehicle-height adjusting valves 41a, 41b, 41c, and 41d, the first on-off valve 48a, the second on-off valve 48b, the third on-off valve 48c, and the fourth on-off valve 48d, the relief valve 52, or the like or driving control of the compressor and motor 44, based on information acquired from the sensors or the like.

Figure 4:
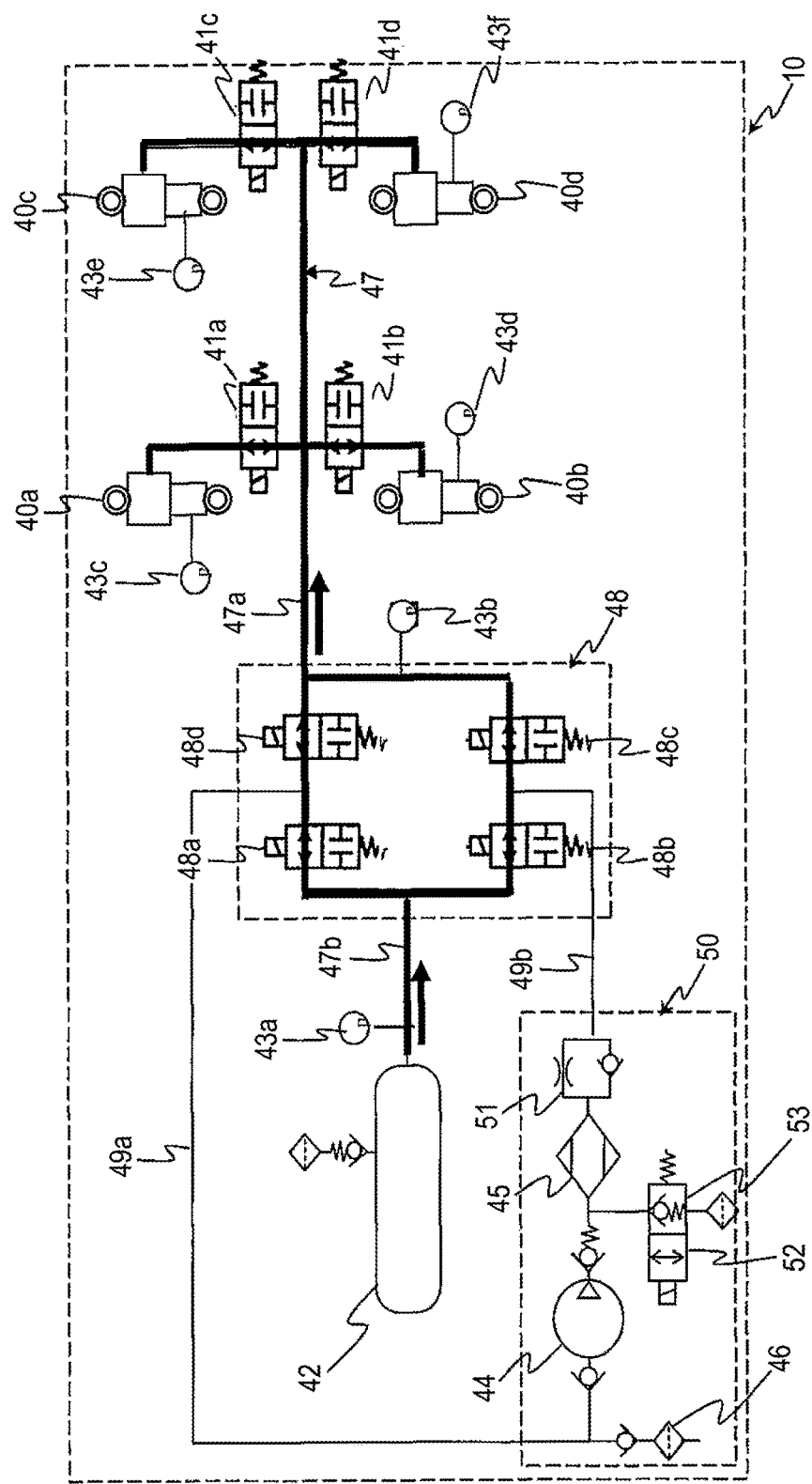
FIG. 4 is a diagram illustrating a configuration of the air suspension system in a case where a vehicle height increases without actuating a compressor according to the embodiment disclosed here.

Next, basic vehicle-height adjusting actuation of the vehicle-height adjusting device 1 will be described. FIG. 4 illustrates actuation of the vehicle-height adjusting device 1 obtained in a case where the pressure on the pressure tank 42 side is higher than the pressure on the air springs 40 side and the working fluid (air) can flow from the pressure tank 42 to the air springs 40 due to the pressure difference between the pressure tank 42 side and the air spring 40 side, in a case where the vehicle-height lifting control is performed.

In the case where the air suspension system 10 performs the vehicle-height lifting control, the ECU 17 controls the opening state of the first on-off valve 48*a*, the second on-off valve 48*b*, the third on-off valve 48*c*, and the fourth on-off valve 48*d* which are included in the circuit valve block 48, and controls the opening state of the vehicle-height adjusting valves 41*a*, 41*b*, 41*c*, and 41*d*.

In this manner, the air in the pressure tank 42 flows to the air springs 40 via the tank-connecting main flow path 47*b*, the circuit valve block 48, the communicating main flow path 47*a*, and the vehicle-height adjusting valves 41. The air flows into the air springs 40, thereby causing the air spring 40 to extend, causing intervals between the wheels and the vehicle body to be widened, and causing the vehicle height to be lifted.

Basically, in the case of the air suspension system 10, the difference between the pressure on the pressure tank 42 side and the pressure on the air springs 40 side causes the working fluid to flow to the air springs 40 side. However, as a result of the flowing of the working fluid from the pressure tank 42 side to the air springs 40 side, the pressure difference that causes the working fluid to sufficiently flow is lost between the pressure tank 42 side and the air springs 40 side in some cases. In addition, there is no sufficient pressure difference (differential pressure) between the pressure tank 42 side and the air springs 40 side at a time point of starting the vehicle-height lifting control in some cases. In such a case, the compressor and motor 44 is driven so as to force the working fluid to be drawn from the pressure tank 42, and the working fluid is subjected to pressure-feeding to the air springs 40 side.

Figure 5:
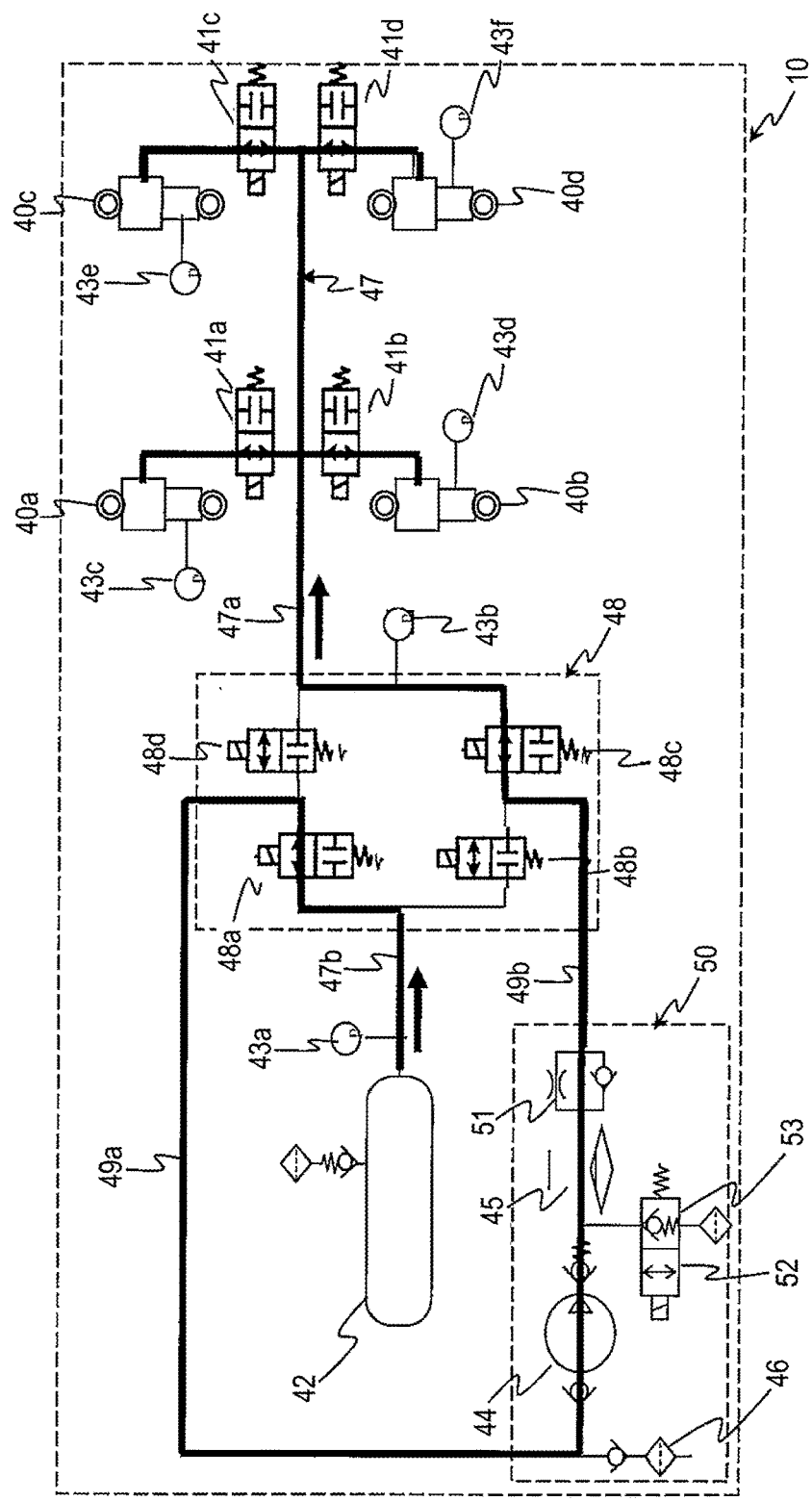
FIG. 5 is a diagram illustrating a configuration of the air suspension system in a case where the vehicle height increases by actuating the compressor according to the embodiment disclosed here.

FIG. 5 illustrates actuation of the air suspension system 10 obtained in a case where the working fluid is subjected to pressure-feeding to the air springs 40 side by using the compressor and motor 44 during the vehicle-height lifting control. As illustrated in FIG. 5, the ECU 17 causes the first on-off valve 48*a* to be in the opened state and causes the fourth on-off valve 48*d* to be in the closed state. In this state, the pressure tank 42 side and the inflow side of the compressor and motor 44 enter a state of communicating with each other.

In addition, the ECU 17 causes the second on-off valve 48*b* to be in the closed state and causes the third on-off valve 48*c* to be in the opened state. In this state, the outflow side of the compressor and motor 44 and the air springs 40 side enter a state of communicating with each other.

As a result, the drive of the compressor and motor 44 causes the working fluid in the pressure tank 42 to be drawn up to the compressor and motor 44 via the tank-connecting main flow path 47*b*, the first on-off valve 48*a*, and the compressor inflow path 49*a*. The drawn-up working fluid is compressed and is subjected to pressure-feeding to the air springs 40 side via the compressor outflow path 49*b*, the third on-off valve 48*c*, the communicating main flow path 47*a*, and the vehicle-height adjusting valves 41. As a result, it is possible to perform the vehicle-height lifting control by the air springs 40 even in a state in which there is no sufficient pressure difference between the pressure tank 42 side and the air springs 40 side.

Figure 6:
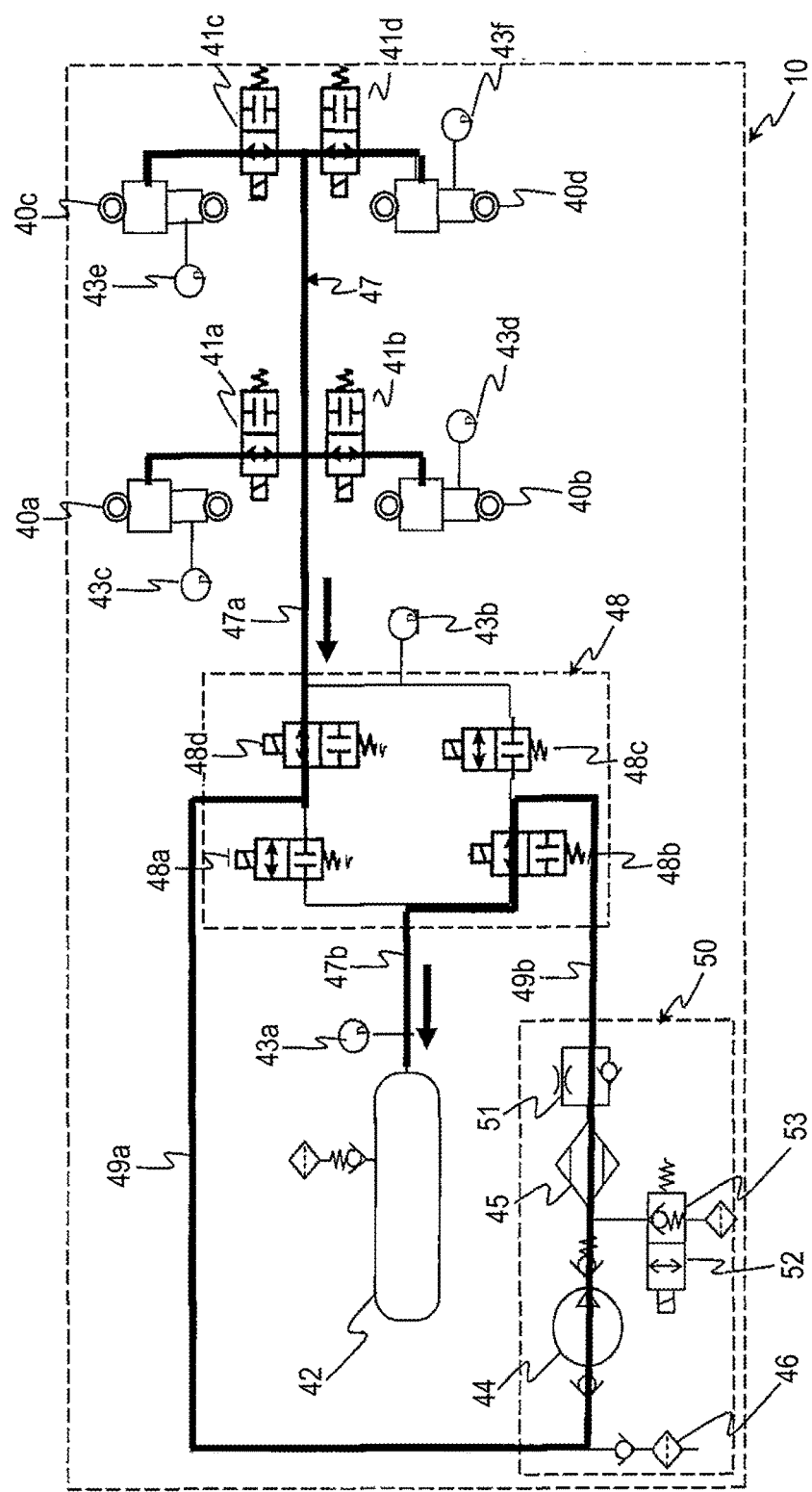
FIG. 6 is a diagram illustrating a configuration of the air suspension system in a case of a decrease in the vehicle height according to the embodiment disclosed here.

Next, an actuation of the air suspension system 10 during the vehicle-height lowering control will be described with reference to FIG. 6. As illustrated in FIG. 6, the ECU 17 causes the first on-off valve 48*a* to be in the closed state and causes the fourth on-off valve 48*d* to be in the opened state. In addition, the second on-off valve 48*b* is caused to be in the opened state and causes the third on-off valve 48*c* is maintained in the closed state. In addition, the vehicle-height adjusting valves 41*a*, 41*b*, 41*c*, and 41*d* are caused to be in the opened state.

As a result, the air springs 40 side and the inflow side of the compressor and motor 44 are in a state of communicating with each other via the vehicle-height adjusting valves 41, the communicating main flow path 47*a*, the fourth on-off valve 48*d*, and the compressor inflow path 49*a*. In addition, the outflow side of the compressor and motor 44 is in a state of communicating with the pressure tank 42 via the compressor outflow path 49*b*, the second on-off valve 48*b*, and the tank-connecting main flow path 47*b*. The working fluid on the air springs 40 side is drawn up by the compressor and motor 44 and is subjected to pressure-feeding to the pressure tank 42.

Next, actuation of the vehicle-height adjusting device according to the embodiment having such a configuration during avoiding the obstacle will be described in detail.

Figure 7:
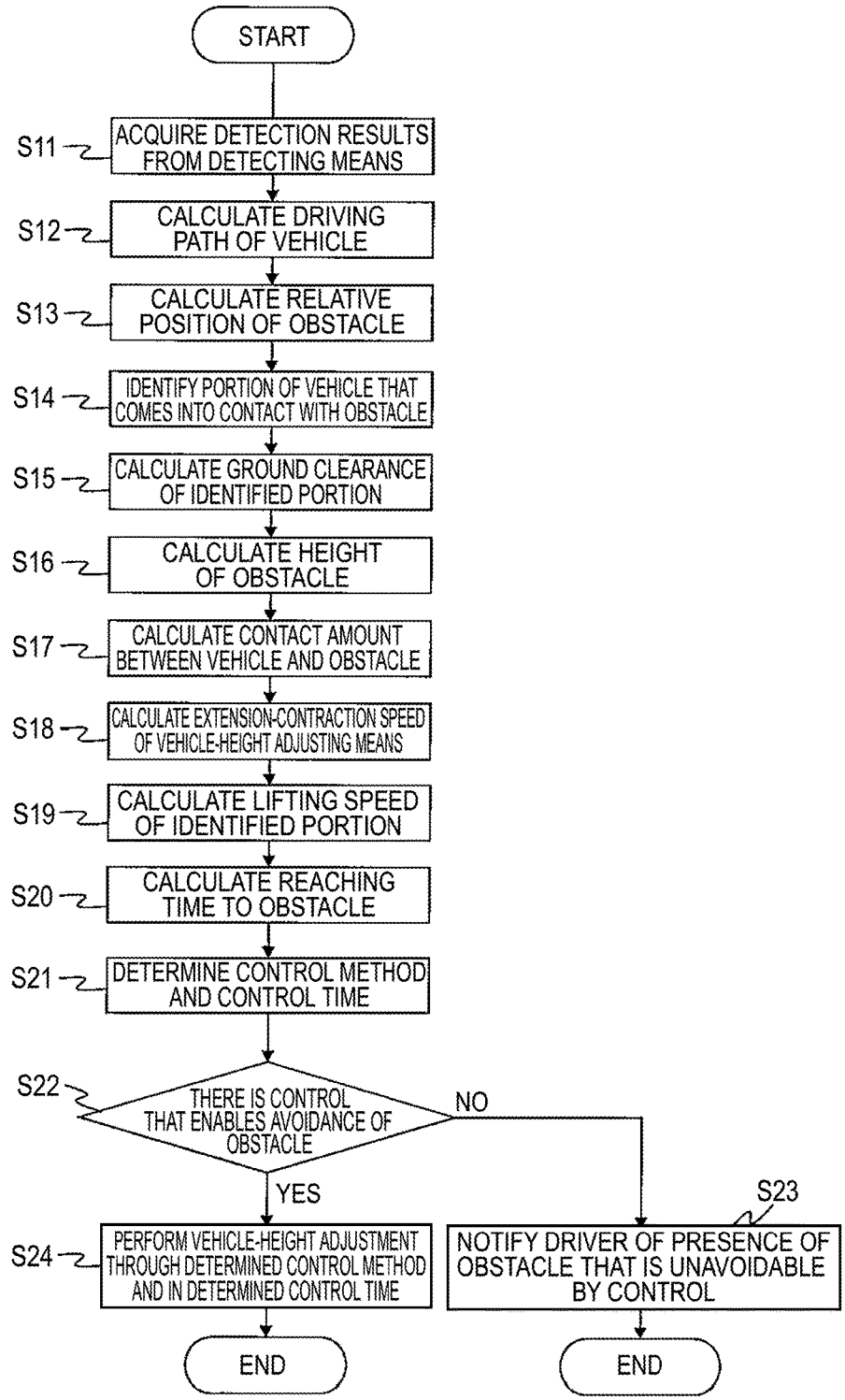
FIG. 7 is a flowchart illustrating an actuation procedure according to the embodiment disclosed here.
Figure 8:
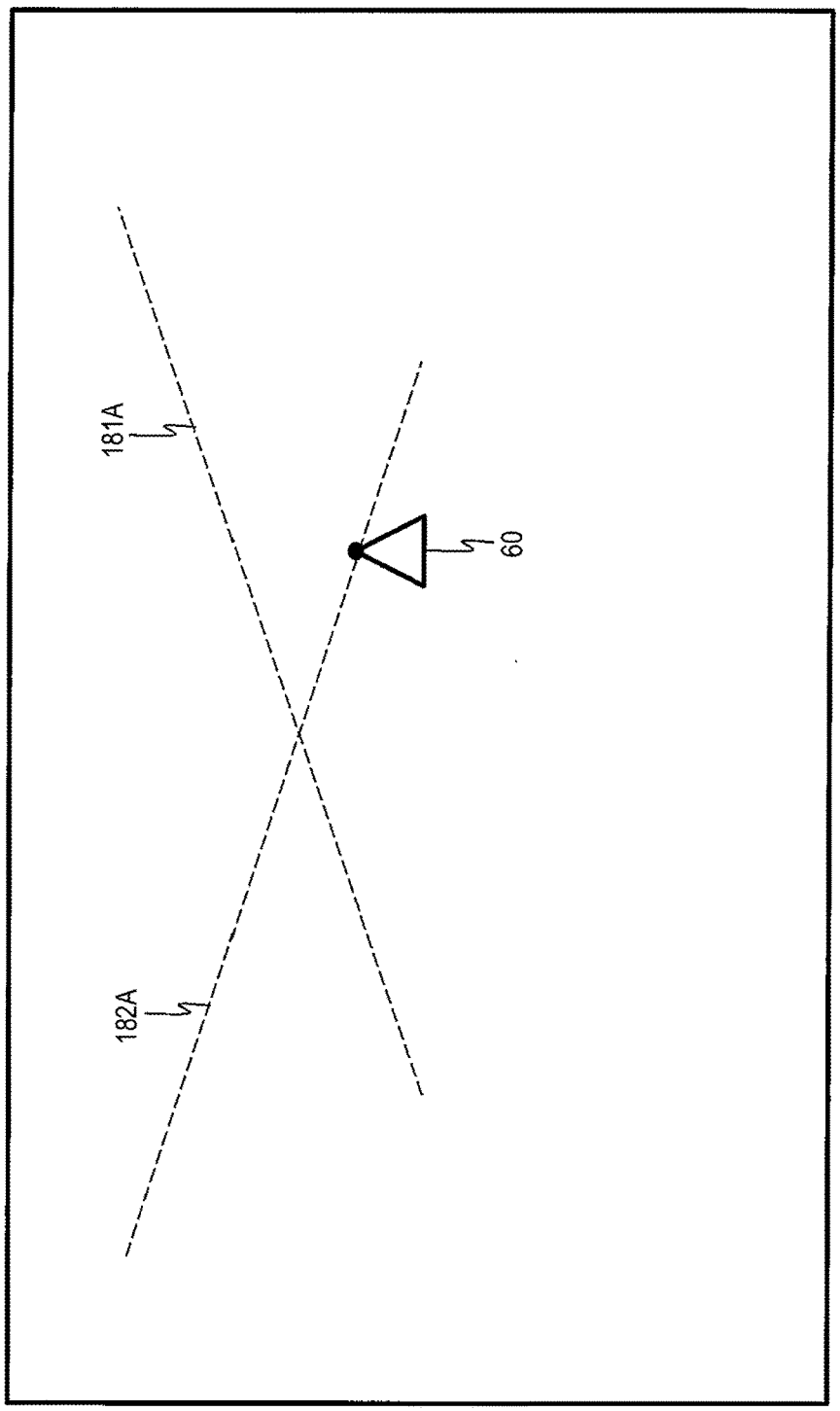
FIG. 8 is a diagram of imaging performed when the apex of an obstacle intersects with one of irradiation lights according to the embodiment disclosed here.
Figure 9:
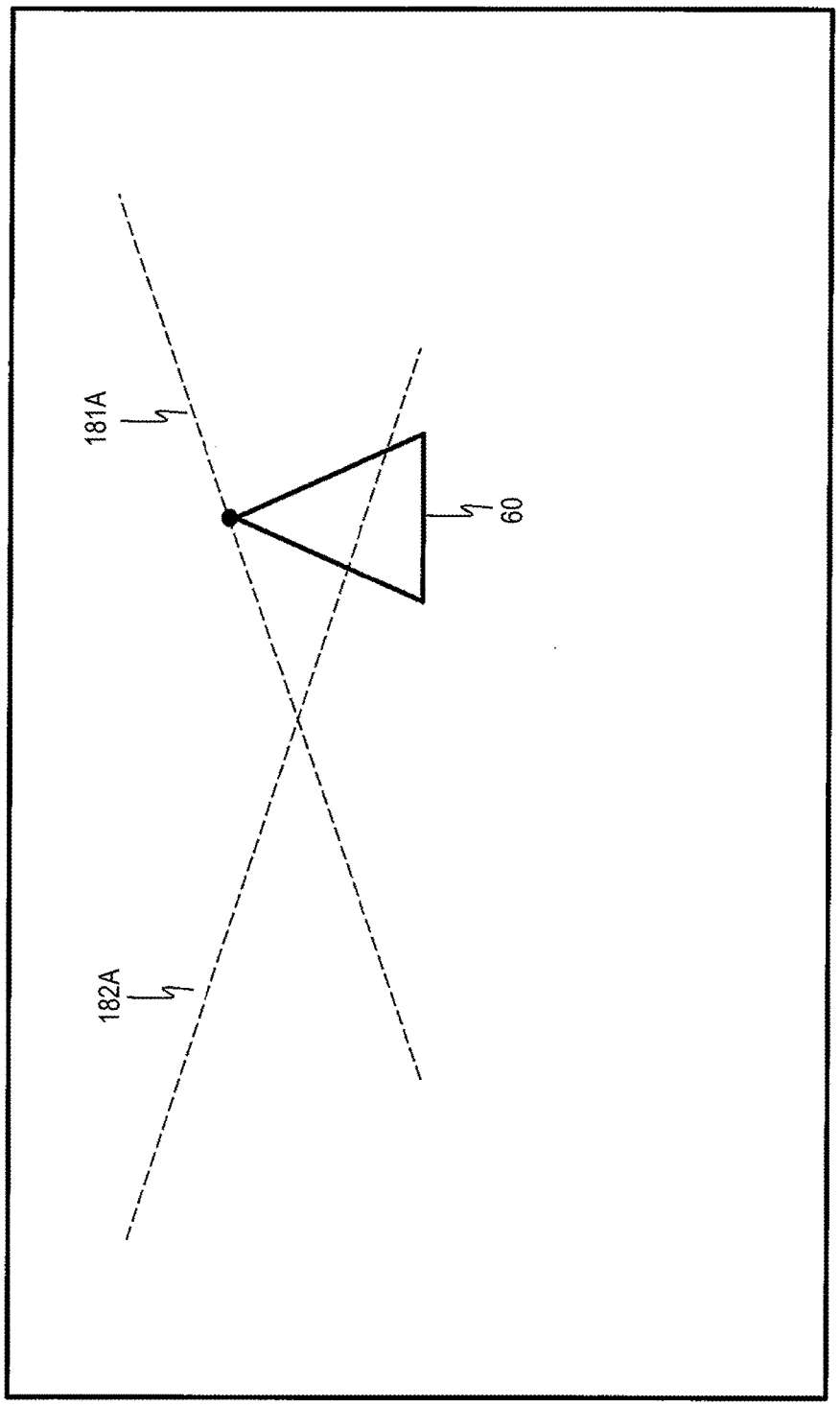
FIG. 9 is a diagram of imaging performed when the apex of the obstacle intersects with the other one of the irradiation lights according to the embodiment disclosed here.
Figure 10:
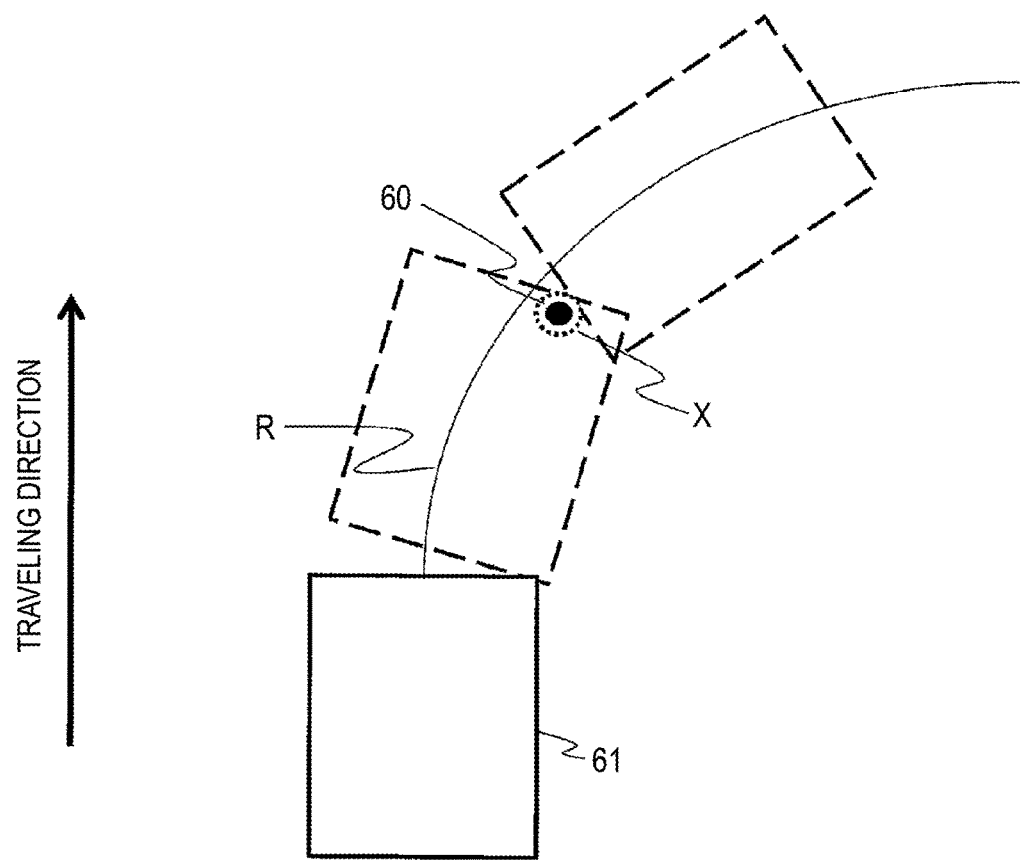
FIG. 10 is a diagram illustrating a relationship between a vehicle and an obstacle when viewed from above, according to the embodiment disclosed here.
Figure 11:
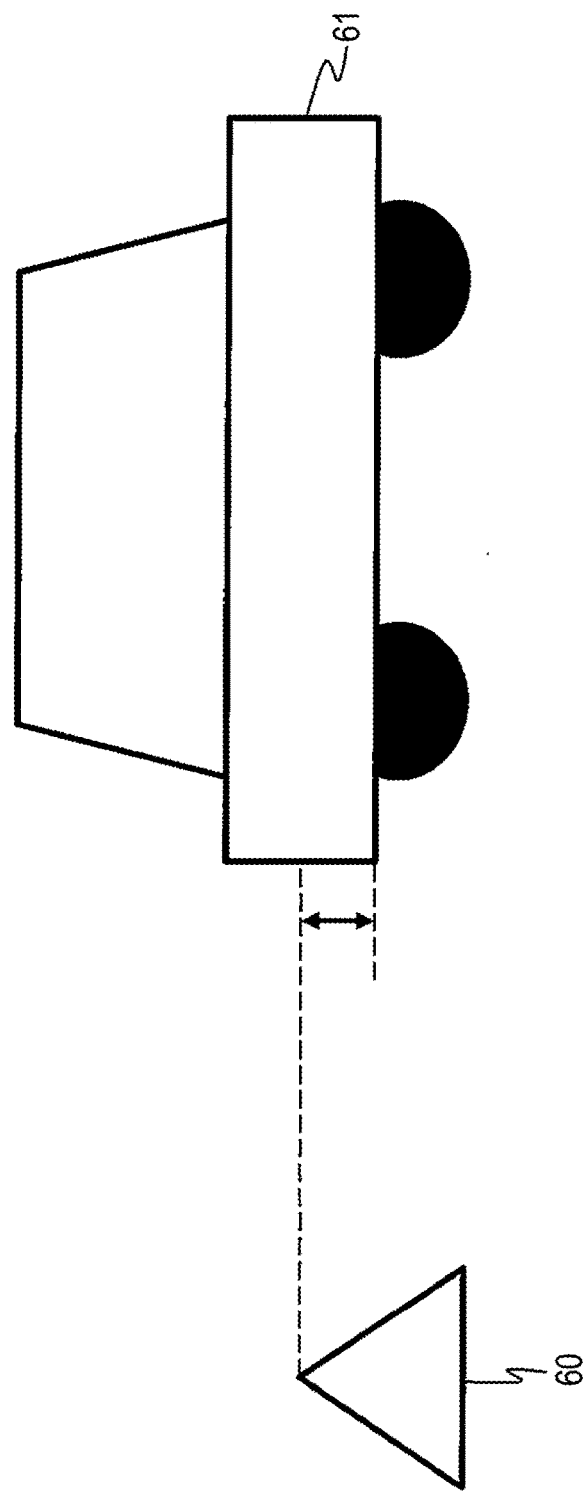
FIG. 11 is a diagram illustrating a relationship between the vehicle and the obstacle when viewed from a lateral side when the vehicle is in a state of having a horizontal posture, according to the embodiment disclosed here.
Figure 12:
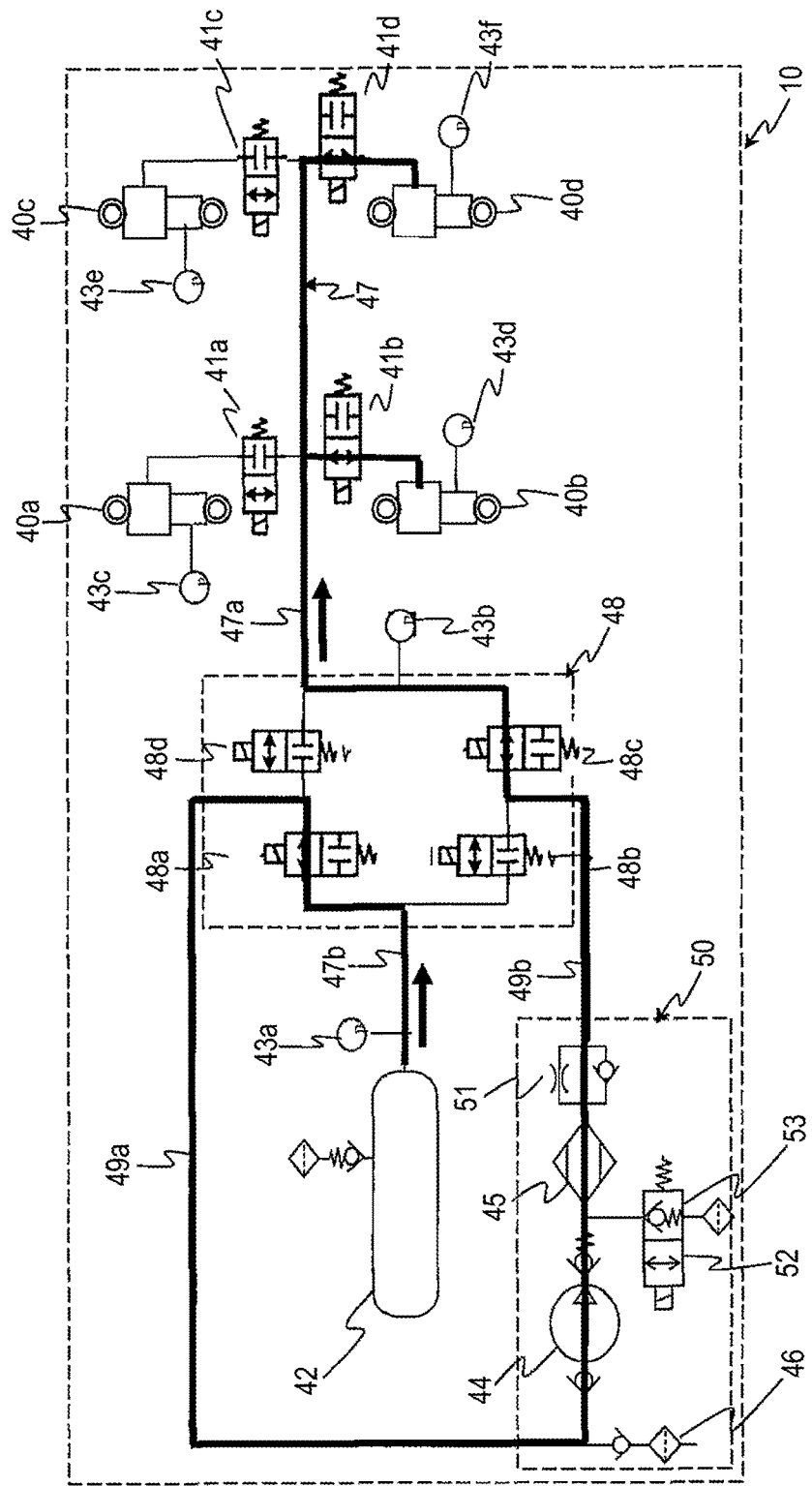
FIG. 12 is a diagram illustrating a configuration of the air suspension system in a case where the vehicle height increases on the left side by actuating the compressor according to the embodiment disclosed here.

FIG. 7 is a flowchart illustrating an operation procedure of the vehicle-height adjusting device according to the embodiment during avoiding the obstacle. FIGS. 8 and 9 are diagrams of imaging of the obstacle and the irradiation lights when viewing the front side of the vehicle from the camera 11. FIG. 10 is a diagram of a vehicle 61 during the driving when viewed from above. FIG. 11 is a diagram of the vehicle 61 during the driving when viewed from a lateral side. FIG. 12 is a diagram illustrating a configuration of the air suspension system 10 during control the two left wheels simultaneously. The operation of the embodiment will be described with reference to FIGS. 1 to 12.

When an ignition switch of the vehicle (not illustrated) turns ON, the ECU 17, the camera 11, the sensors 12 to 14 and 43, and the light source 18 of the vehicle-height adjusting device 1 are actuated, and the flow in FIG. 7 is started in the ECU 17.

As illustrated in FIG. 7, in Step S11, first, the ECU 17 acquires detection results from the detection units. In other words, as described above, the captured image of the front side of the vehicle is acquired from the camera 11, the displacement amount of the suspension arm, that is, an amount of extension and contraction of the air spring 40, is acquired from the vehicle height sensor 12, the rotating state of the rotor is acquired from the wheel speed sensor 13, the components of the magnetic field in two directions are acquired from the steering angle sensor 14, and the air pressure in the air suspension system 10, that is, in the air springs 40 is acquired from the pressure sensor 43.

In Step S11, when the ECU 17 acquires the image from the camera 11, as described above, the ECU 17 performs the image processing through various types of filters or the like, converts the image such that it is possible to recognize the position of the bright spot in the image, and detects an image signal thereof, that is, detects the obstacle. It is needless to say that the range, in which it is possible to detect the obstacle, is limited to a range in which it is possible for the camera to perform imaging, and a detectable distance changes depending on a size of the obstacle. When the bright spot has, for example, a different color, it is easy to recognize the spot. In addition, the ECU 17 is also connected to the light sources 181 and 182, the ECU is capable of recognizing an irradiation condition, or controlling the irradiation condition (irradiation angle).

In addition, when the ECU 17 acquires the rotation state of the rotor from the wheel speed sensor 13 in Step S11, as described above, the ECU 17 calculates the rotating speed of the wheels from the detected rotating state of the rotor, and calculates the speed of the vehicle, that is, detects the speed of the vehicle from the calculation result. Since the rotating speed of the wheels and the speed of the vehicle have a proportional relationship, the speed of the vehicle is obtained by a product of the rotating speed of the wheels and a proper constant.

In addition, since the rotating speed of four wheels is detected, it is necessary to determine a rotating speed of a wheel used in the calculation. In general, a method in which any one is selected from the four wheels and the speed thereof is used in the calculation, or a method in which the speed of the vehicle is calculated from an average value of the calculation result of the rotating speed of the four wheels is known.

Further, when the ECU 17 acquires the components of the magnetic field in two directions from the steering angle sensor 14 in Step S11, as described above, the ECU 17 calculates the steering angle from the detection result by the steering angle sensor 14. Since it is possible to detect the sizes of the components of the magnetic field in two directions in the magnetic-field detecting unit from the steering angle sensor 14, the steering angle is calculated, that is, the steering angle of the vehicle is detected, from a ratio between the sizes in the two directions.

Next, in Step S12, the driving-path calculating unit 21 of the ECU 17 calculates the driving path of the vehicle, from the steering angle calculated from the detection result by the steering angle sensor 14 and the speed of the vehicle calculated from the detection result by the wheel speed sensor 13.

If the speed of the vehicle is constant, it is possible to calculate the driving path from only the steering angle calculated from the detection result by the steering angle sensor 14. However, since the vehicle is assumed to be driven by a driver in the embodiment disclosed here, the speed of the vehicle changes depending on accelerator work of the driver. Hence, it is necessary to calculate the driving path by using not only the steering angle but also using the speed of the vehicle.

In a case where the steering angle is constant, a driving path has a curve bulging outward due to a centrifugal force with respect to a direction in which the vehicle rounds a bend as the speed of the vehicle increases. An example of a calculation method includes a method in which the driving path is defined from a relationship with the steering angle for every division of the speed of the vehicle.

First, the speed of the vehicle is divided in a stepwise manner, and the traveling path is set with respect to the steering angle for each division. The division is considered to be from rough division (high-speed driving, low-speed driving, and stopping) to fine division such as an interval per 1 km/h; however, the division may be performed to the finest extent in order to identify the positional relationship between the obstacle and the vehicle with accuracy.

In addition, there is also a method in which a basic driving path is set and is corrected depending on the speed of the vehicle; however, the calculation is performed in the embodiment disclosed here through a method of using division that is easy to be adapted because an effect changes depending on the center of gravity or weight, a vehicle height, or the like of a vehicle. An example of content prepared for each division is a position of the turning center when viewed from the vehicle. Since the vehicle is to be driven on a circle with the turning center as the center, it is possible to obtain the driving path from the position of the turning center.

In Step S13, the obstacle-position calculating unit 27 of the ECU 17 calculates the relative position of the obstacle when viewed from the vehicle from the calculated speed of the vehicle and the detection result by the camera 11.

As illustrated in FIG. 8, in a case where the obstacle 60 does not have the linear shape but has a three-dimensional shape, the top portion of the obstacle and the irradiation lights 181A and 182A intersect with each other at points as long as the top portion of the obstacle 60 is not parallel to the irradiation lights 181A and 182A. In other words, since the top portion of the obstacle becomes the bright spot, a portion in which the obstacle has the bright spot is recognized as the top portion of the obstacle.

FIG. 9 is a diagram of imaging of the obstacle and the irradiation lights obtained when the vehicle moves forward by a predetermined distance from a state in FIG. 8. As illustrated in FIGS. 8 and 9, since the obstacle 60 is positioned on the right side when viewed from the vehicle, the obstacle first intersects with the irradiation light 182A. FIG. 8 illustrates a case where the obstacle 60 has the bright spot formed with the irradiation light 182A, and FIG. 9 illustrates a case where the obstacle 60 has the bright spot formed with the irradiation light 181A.

In addition, as described above, in a case where the top portion of the obstacle is parallel to the irradiation lights 181A and 182A, intersection of the top portion of the obstacle with the irradiation lights 181A and 182A does not form a point. Therefore, the uppermost portion of the portion in which the obstacle intersects with the irradiation lights 181A and 182A is considered as the bright spot during the imaging at the time when the intersection of the obstacle with the irradiation lights 181A and 182A occurs.

Since the bright spots are formed with respect to the irradiation lights 181A and 182A, respectively, two bright spots are formed with respect to one obstacle. A current distance from the vehicle to the obstacle is calculated, based on a moving distance from the time when a first bright spot in FIG. 8 is formed to the time when a second bright spot in FIG. 9 is formed, which is calculated from the speed of the vehicle and time taken from the time when the first bright spot is formed to the time when the second bright spot is formed, and a height from a reference position (ground) of the bright spot in the imaging of the first bright spot and the second bright spot.

Since two objects, which originally have different sizes, appear to have the same size in an image captured by the camera, depending on distances of the objects to the camera, it is not possible to calculate the height of the obstacle from one bright spot with accuracy. The distance to the obstacle is determined from the calculation result of the moving distance and the heights of the two bright spots from the reference position.

In addition, it is possible to know the position of the obstacle from the distance from the vehicle to the obstacle and the position of the bright spots in the images. Since the distance from the vehicle to the obstacle is known, and the irradiation angles of the irradiation lights 181A and 182A are constant, the position of the obstacle is determined to be one point. In this manner, the relative position of the obstacle when viewed from the vehicle is calculated.

Subsequently, in Step S14, the identification unit 20 of the ECU 17 identifies a portion of the vehicle 61 that overlaps the obstacle 60 as illustrated in FIG. 10, based on the calculated driving path and the relative position of the obstacle when viewed from the vehicle. Since both of a driving path R of the vehicle 61 and the position of the obstacle 60 are calculated as the relative positions when viewed from the vehicle 61, it is possible to identify a portion X of the vehicle 61 that overlaps the obstacle 60 from the calculation results, respectively.

In Step S15, the ground-clearance calculating unit 22 of the ECU 17 calculates ground clearance of a bottom of the vehicle in the portion X of the vehicle 61 that overlaps the obstacle 60, from the identification result and the detection result by the vehicle height sensor 12. The ground clearance of the bottom of the vehicle is obtained through plotting, on a three-dimensional coordinate, the positions of the wheels and the displacement amounts detected by the vehicle height sensors 12 corresponding to the wheels. For example, a position $(X_{FR}, Y_{FR})$ of the front right wheel is plotted on XY coordinates of the three-dimensional coordinate, a value $Z_{FR}$ obtained by adding the height from the ground surface to the bottom of the vehicle in a normal state to the detection result by the vehicle height sensor 12 corresponding to the front right wheel is plotted on a Z coordinate, and thereby the ground clearance of the bottom of the vehicle of the front right wheel portion is represented by $(X_{FR}, Y_{FR}, Z_{FR})$.

Similarly, the front left wheel, the rear right wheel, the rear left wheel are plotted as $(X_{FL}, Y_{FL}, Z_{FL})$, $(X_{RR}, Y_{RR}, Z_{RR})$, and $(X_{RL}, Y_{RL}, Z_{RL})$ on the three-dimensional coordinate. The portion X described above is plotted on a plane formed by connecting the points with straight lines, and thereby the ground clearance of the bottom of the vehicle in the portion X is obtained.

It is even better to perform the plotting of unevenness of the bottom of the vehicle; however, the calculation is complicated, and thus the bottom of the vehicle is set to be a flat surface in the embodiment. The flat surface of the bottom of the vehicle may have, as a reference, the lowest portion of the bottom of the vehicle to the ground surface when the vehicle is horizontal. In addition, it is possible to reduce an amount of calculation to the extent that a range of calculation is limited to the portion X that overlaps the obstacle.

In Step S16, the obstacle-height calculating unit 23 of the ECU 17 calculates the height of the obstacle from the detection result by the camera 11.

The height of the obstacle is also determined from the position of the obstacle that is identified in the process in Step S13. The irradiation is performed with the irradiation lights 181A and 182A at the predetermined angle inclined from the perpendicular direction to the horizontal direction, and an immediate upper portion from the obstacle overlaps the irradiation lights 181A and 182A at only one point when the position of the obstacle is determined. Therefore, it is possible to identify the height.

In Step S17, the contact-amount calculating unit 24 of the ECU 17 calculates the contact amount between the vehicle and the obstacle in the portion X of the vehicle 61 that overlaps the obstacle 60. Since the height of the bottom of the vehicle in the portion X of the vehicle 61 that overlaps the obstacle 60 is already calculated in the process in Step S15, a difference between the position of the overlapping and the height of the obstacle is calculated, and thereby the contact amount between the vehicle and the obstacle is calculated.

As illustrated in FIG. 11, in a case where the vehicle 61 is horizontal, an arrow in FIG. 11 indicates the contact amount between the obstacle 60 and the vehicle 61. The contact amount is obtained by subtracting the ground clearance of the bottom of the vehicle from the height of the obstacle 60. Therefore, a plus value of the calculation result of the contact amount indicates risk of contact.

In Step S18, the actuation-speed calculating unit 26 of the ECU 17 calculates the speed depending on the extension and contraction of the air spring 40 from the detection result by the pressure sensor 43.

The air suspension system 10 is capable of performing the vehicle height adjustment by driving the compressor and motor 44, in addition to the differential pressure between the pressure tank 42 and the air springs 40. An aim of the vehicle-height adjusting device 1 of the embodiment is to avoid the obstacle, and is highly urgent. Therefore, in general, a vehicle-height adjustment speed is calculated with a premise of a case where the compressor and motor 44, which has a high vehicle-height adjustment speed, is driven.

In the embodiment, the vehicle-height adjustment speed is maintained as a map or the like, and is determined from the detection result by the pressure sensor 43. Since the vehicle-height adjustment speed changes depending on the weight of the vehicle or a capacity of the air spring 40, performance of the compressor and motor 44, or the like, it is necessary to perform adaptation for each vehicle. Therefore, a map that is easy to reflect the adaptation result is used in the embodiment.

In addition, the map includes a map for determining a pressure state of the main flow path from the results acquired from the first pressure sensor 43a and the second pressure sensor 43b, and a map for determining an extension/contraction speed of the air springs 40a to 40d in the control methods used in cases the control is performed by the control methods (four-wheel simultaneous control, two-left-wheel simultaneous control, and two-right-wheel simultaneous control) from the pressure state of the main flow path and the detection results by the pressure sensors 43c to 43f disposed to the wheels. Thus, the vehicle-height adjustment speed is determined in combination of the maps.

In Step S19, the vehicle-bottom lifting-speed calculating unit 25 of the ECU 17 calculates a lifting speed of the bottom of the vehicle in the identified portion X from the extension/contraction speed of the air springs 40a to 40d obtained in Step S18 and the identification result of the overlapped portion obtained in Step S14.

For example, the positions of the wheels and the extension/contraction speeds of the air springs 40a to 40d corresponding to the wheels are obtained by performing the plotting on the three-dimensional coordinate. For example, a position $(X_{FR}, Y_{FR})$ of the front right wheel is plotted on XY coordinates of the three-dimensional coordinate, an extension/contraction speed $Z_{FRs}$ of the air spring 40a corresponding to the front right wheel is plotted on a Z coordinate, and thereby the extension/contraction speed of the bottom of the vehicle of the front right wheel portion is represented by $(X_{FR}, Y_{FR}, Z_{FRs})$.

Similarly, the front left wheel, the rear right wheel, the rear left wheel are plotted as $(X_{FL}, Y_{FL}, Z_{FLs})$, $(X_{RR}, Y_{RR}, Z_{RRs})$, and $(X_{RL}, Y_{RL}, Z_{RLs})$ on the three-dimensional coordinate. The portion X described above is plotted on a plane formed by connecting the points with straight lines, and thereby the extension/contraction speed of the bottom of the vehicle in the portion X is obtained.

In Step S20, the reaching-time calculating unit 28 of the ECU 17 calculates the time taken for the front portion of the vehicle to reach the obstacle, from the calculation result of the relative position of the obstacle when viewed from the vehicle and the driving path of the vehicle and the speed of the vehicle.

It is possible to calculate the position at which the front side of the vehicle reaches the obstacle and the path to the reaching, from the driving path of the vehicle and the relative position of the obstacle from the vehicle. The distance from a position at the current time point to a position at which the front portion of the vehicle reaches the obstacle is calculated, from the calculation result, and the time taken for the vehicle to reach the obstacle is calculated from the calculation result and the speed of the vehicle.

In Step S21, the control determining unit 29 of the ECU 17 determines the control method and the control time, from the calculated contact amount between the obstacle and the vehicle, the lifting speed of the bottom of the vehicle in the identified portion X, and the reaching time to the obstacle. In other words, the ECU 17 determines at least the control method. As described above in the embodiment, it is possible to perform three patterns of control of the four-wheel simultaneous control, the two-left-wheel simultaneous control, and the two-right-wheel simultaneous control.

First, a lifting amount of the bottom of the vehicle until the vehicle reaches the obstacle is calculated from the reaching time to the obstacle and the vehicle-bottom lifting speed in the case where the four-wheel simultaneous control, the two-left-wheel simultaneous control, and the two-right-wheel simultaneous control are performed, respectively. In this case, it is more preferable that the calculation is performed in time shorter than the time taken for the vehicle to reach the obstacle 60, by a predetermined time. When the calculation takes time shorter than the time taken to reach the obstacle, it is possible to have extra time corresponding to a change in a control amount of the vehicle-height adjusting device 1 due to a change in the driving path occurring in the middle thereof.

Time taken to perform the four-wheel simultaneous control and the two-left-wheel simultaneous control, or time taken to perform the four-wheel simultaneous control and the two-right-wheel simultaneous control are set such that the contact amount of the obstacle 60 with the bottom of the vehicle in the identified portion X from the calculation result is smaller than or equal to a predetermined value. The predetermined value in this case is a minus value. In addition, it is desirable to have a state in which there is an extra space such that a certain degree of space is formed between the obstacle 60 and the bottom of the vehicle rather than a state in which the contact amount is zero.

At this time, the conditions are set such that as long time as possible is taken to perform the four-wheel simultaneous control. The conditions are set such that as long time as possible is taken to perform the four-wheel simultaneous control, and thereby it is possible to reduce the inclination of the vehicle to the smallest extent.

In the following Step S22, the determination unit 30 of the ECU 17 determines whether or not there exists control to avoid the obstacle 60. In other words, determination of whether or not it is possible to set the time taken to perform the four-wheel simultaneous control and the two-left-wheel simultaneous control, or time taken to perform the four-wheel simultaneous control and the two-right-wheel simultaneous control such that the contact amount is smaller than or equal to the predetermined value is performed.

In a case where it is not possible to set time to perform any of the control, the determination that control to avoid the obstacle 60 does not exist is performed, and the process proceeds to Step S23. In addition, in a case where it is possible to set time to perform the control, the determination is performed that control to avoid the obstacle 60 exists, and the process proceeds to Step S24.

In Step S22, it is more preferable that a limit is also set on the inclination of the vehicle. When one-side two-wheel simultaneous control of the right and left wheels is performed, the inclination of the vehicle increases. When the inclination of the vehicle increases, there is a possibility that steering stability is degraded.

Therefore, in a case where the control to avoid the obstacle 60 exists, the amount of extension and contraction of the air spring 40 at the time of completing the control is calculated, based on the determined control time, and a difference of the amounts of extension and contraction between the smallest amount of extension and contraction of the air spring 40 and the largest amount of extension and contraction of the air spring 40. In a case where the difference is larger than or equal to a predetermined difference, determination that the control to avoid the obstacle does not exist is performed, and the control is not performed.

In a case where the determination result of the avoidability of the obstacle 60 is that it is possible to avoid the obstacle in Step S22, the control determining unit 29 of the ECU 17 determines, as the control to be performed, the control that is possible to be set in the time taken to perform the control in Step S24, and the control unit 38 of the ECU 17 causes the air suspension system 10 to be actuated and performs the vehicle height adjustment, based on the set time taken for performing.

As illustrated in FIG. 5, the four-wheel simultaneous control performs pressure-feeding of the working fluid to the air springs 40 side by using the compressor and motor 44 in the air suspension system 10 as described above. As illustrated in FIG. 5, the ECU 17 causes the first on-off valve 48a to be in the opened state and causes the fourth on-off valve 48d to be in the closed state. In this state, the pressure tank 42 side and the inflow side of the compressor and motor 44 enter a state of communicating with each other.

In addition, the ECU 17 causes the second on-off valve 48b to be in the closed state and causes the third on-off valve 48c to be in the opened state. In this state, the outflow side of the compressor and motor 44 and the air springs 40 side enter a state of communicating with each other.

As a result, the drive of the compressor and motor 44 causes the working fluid in the pressure tank 42 to be drawn up to the compressor and motor 44 via the tank-connecting main flow path 47b, the first on-off valve 48a, and the compressor inflow path 49a. The drawn-up working fluid is compressed and is subjected to pressure-feeding to the air springs 40 side via the compressor outflow path 49b, the third on-off valve 48c, the communicating main flow path 47a, and the vehicle-height adjusting valves 41. Further, the adjusting valves 41a to 41d are in the opened state, thereby the air subjected to the pressure feeding to the air springs 40 of all of the four wheels is supplied to the wheels, and it is possible to perform the four-wheel simultaneous control.

Next, actuation performed in a case where the one-side two-wheel simultaneous control is performed will be described with reference to the two-left-wheel simultaneous control as an example. FIG. 12 illustrates actuation of the air suspension system 10 obtained in a case where the working fluid is subjected to pressure-feeding to the air springs 40 side by using the compressor and motor 44 during the two-left-wheel simultaneous control. As illustrated in FIG. 12, the ECU 17 causes the first on-off valve 48a to be in the opened state and causes the fourth on-off valve 48d to be in the closed state. In this state, the pressure tank 42 side and the inflow side of the compressor and motor 44 enter a state of communicating with each other.

In addition, the ECU 17 causes the second on-off valve 48*b* to be in the closed state and causes the third on-off valve 48*c* to be in the opened state. In this state, the outflow side of the compressor and motor 44 and the air springs 40 side enter a state of communicating with each other.

As a result, the drive of the compressor and motor 44 causes the working fluid in the pressure tank 42 to be drawn up to the compressor and motor 44 via the tank-connecting main flow path 47*b*, the first on-off valve 48*a*, and the compressor inflow path 49*a*. The drawn-up working fluid is compressed and is subjected to pressure-feeding to the air springs 40 side via the compressor outflow path 49*b*, the third on-off valve 48*c*, the communicating main flow path 47*a*, and the vehicle-height adjusting valves 41. Further, the FR adjusting valve 41*a* and the RR adjusting valve 41*c* are in the closed state, the FL adjusting valve 41*b* and the RL adjusting valve 41*d* are in the opened state, and thereby it is possible for the air subjected to the pressure feeding to be supplied to the FL air spring 40*b* and the RL air spring 40*d* and to perform the two-left-wheel simultaneous control without supplying the air to the FR air spring 40*a* and the RR air spring 40*c*.

In a case of the two-right-wheel simultaneous control, the FR adjusting valve 41*a* and the RR adjusting valve 41*c* are in the opened state, the FL adjusting valve 41*b* and the RL adjusting valve 41*d* are in the closed state, and thereby it is possible for the air subjected to pressure feeding to be supplied to the FR air spring 40*a* and the RR air spring 40*c* and to perform the two-right-wheel simultaneous control without supplying the air to the FL air spring 40*b* and the RL air spring 40*d*.

In the control to avoid the obstacle that is performed by the vehicle-height adjusting device 1 according to the embodiment, first, the four-wheel simultaneous control is performed, and then one of the two-right-wheel simultaneous control or the two-left-wheel simultaneous control is performed. In other words, at least one air spring 40 is controlled.

The four-wheel simultaneous control is unlikely to receive an influence from a change in the driving path than the one-side two-wheel simultaneous control of the right and left wheels. In addition, when the one-side two-wheel simultaneous control of the right and left wheels is first performed, the amount of the vehicle height adjustment required in a case where the opposite one-side two-wheel simultaneous control has to be performed is likely to more increase than in the case of the four-wheel simultaneous control, in a case where the driving path changes. Therefore, the four-wheel simultaneous control is first performed. In addition, when the one-side two-wheel simultaneous control of the right and left wheels is first performed, a state in which the steering stability is degraded with the vehicle inclined is continued for a longer time than the case where the four-wheel simultaneous control is first performed. Therefore, the four-wheel simultaneous control is first performed.

In step S23, the control unit 38 of the ECU 17 actuates the indicator 15 and the alarm 16 such that the indicator and the alarm notify the driver that there exists an obstacle that is unavoidable by the vehicle-height adjusting control in a case where the determination result of the avoidability of the obstacle 60 is that it is not possible to avoid the obstacle in Step S22.

As described above in detail, according to the embodiment, the following effects are to be achieved.

In the configuration of the vehicle-height adjusting device 1 according to the embodiment disclosed here, in a case where the obstacle 60 is present in front of the vehicle 61, the identification unit 20 identifies the portion X of the vehicle 61 that overlaps the obstacle 60, based on the detection results by the camera 11 and the steering angle sensor 14, respectively. Then, the ECU 17 actuates the air spring 40 so as to adjust the vehicle height, based on the identification result by the identification unit 20.

In this manner, it is possible to increase options of control methods for avoiding the obstacle, in order to control any air spring 40 of a plurality of air springs 40 in any method based on the portion X of the vehicle 61 that overlaps the obstacle 60, and it is possible to select an appropriate control method from the options. Therefore, it is possible to highly efficiently avoid the obstacle and to perform more appropriate vehicle-height adjusting control than the related art.

Further, the driving-path calculating unit 21 calculates the driving path R of the vehicle 61, based on the detection results by the steering angle sensor 14 and the wheel speed sensor 13, respectively. The identification unit 20 identifies the portion X of the vehicle 61 that overlaps the obstacle 60, based on the detection result by the camera 11 and the calculation result by the driving-path calculating unit 21.

In this manner, the driving-path calculating unit 21 calculates the driving path R from the detection results by the steering angle sensor 14 and the wheel speed sensor 13, respectively, and thereby it is possible for the identification unit 20 to identify the portion X of the vehicle 61 that overlaps the obstacle 60 with higher accuracy than in a case of using only the steering angle sensor 14. Therefore, it is possible to select more appropriate control method.

Further, the ground-clearance calculating unit 22 calculates the ground clearance of the bottom of the vehicle in the portion X of the vehicle 61 that overlaps the obstacle 60, based on the identification result by the identification unit 20 and the detection result by the vehicle height sensor 12, and the obstacle-height calculating unit 23 calculates the height of the obstacle 60, based on the detection result by the camera 11. The contact-amount calculating unit 24 calculates the contact amount between the vehicle 61 and the obstacle 60 in the portion X of the vehicle 61 that overlaps the obstacle 60, based on the calculation results by the ground-clearance calculating unit 22 and the obstacle-height calculating unit 23. The ECU 17 actuates the air spring 40 so as to adjust the vehicle height, based on the calculation result by the contact-amount calculating unit 24.

In this manner, the adjustment amount when the vehicle-height adjusting device 1 is actuated is obtained with higher accuracy. Therefore, it is possible to perform more appropriate control. In addition, it is possible to prevent the steering stability from being degraded due to excessive lifting of the vehicle height.

Further, the driving-path calculating unit 21 calculates the driving path R of the vehicle 61, based on the detection results by the steering angle sensor 14 and the wheel speed sensor 13, respectively. The identification unit 20 identifies the portion X of the vehicle 61 that overlaps the obstacle 60, based on the detection result by the camera 11 and the calculation result by the driving-path calculating unit 21. Then, the vehicle height is adjusted by using the air spring 40. The vehicle height sensor 12 detects the displacement amount of the air spring 40, and the ground-clearance calculating unit 22 calculates the ground clearance of the bottom of the vehicle from the identification result by the identification unit 20 and the detection result by the vehicle height sensor 12. The obstacle-height calculating unit 23 calculates the height of the obstacle 60, based on the detection result by the camera 11, and the contact-amount calculating unit 24 calculates the contact amount between the vehicle 61 and the obstacle 60 in the portion of the vehicle 61 that overlaps the obstacle 60, based on the calculated results by the ground-clearance calculating unit 22 and the obstacle-height calculating unit 23, respectively. The actuation-speed calculating unit 26 calculates the speed depending on the extension and contraction of the air spring 40, based on the detection result by the pressure sensor 43, and the vehicle-bottom lifting-speed calculating unit 25 calculates the lifting speed of the bottom of the vehicle in the portion X of the vehicle 61 that overlaps the obstacle 60, based on the identification result by the identification unit 20 and the calculation result by the actuation-speed calculating unit 26. The obstacle-position calculating unit 27 calculates the relative position of the obstacle 60 from the vehicle 61, based on the detection result by the camera 11, and the reaching-time calculating unit 28 calculates time taken for the foremost portion of the vehicle 61 to reach the obstacle 60, based on the identification result by the identification unit 20, the detection result by the wheel speed sensor 13, the calculation result by the driving-path calculating unit 21, and the calculation result by the obstacle-position calculating unit 27. The control determining unit 29 determines the control method of the air spring 40, based on the calculation result by the contact-amount calculating unit 24, the calculation result by the vehicle-bottom lifting-speed calculating unit 25, and the calculation result by the reaching-time calculating unit 28. The determination unit 30 determines whether or not it is possible to avoid the contact between the vehicle 61 and the obstacle 60, based on the determination result by the control determining unit 29. In the case where the determination unit 30 determines that it is possible to avoid the contact between the vehicle 61 and the obstacle 60, the ECU 17 actuates the air spring 40 so as to adjust the vehicle height, based on the control method determined by the control determining unit 29.

In this manner, it is possible to select the control method in which it is possible to maintain a state in which the vehicle is in a state closest to the horizontal posture, based on the lifting amount of the vehicle until the obstacle 60 is brought into contact for each control method. Hence, it is possible to perform more appropriate control of states of the obstacle and the vehicle.

In addition, the vehicle-bottom lifting speed calculated from the detection result by the pressure sensor 43, the time taken for the vehicle to reach the obstacle calculated from the calculation results of the driving path and the position of the obstacle, and the control method and the control time for avoiding the obstacle on the basis of the contact amount are determined. In this manner, it is possible to select a combination of the control time and the control method in which it is possible to maintain a state in which the vehicle is in a state closest to the horizontal posture, based on the lifting amount of the vehicle until the obstacle 60 is brought into contact for each control method. Hence, it is possible to perform more appropriate control of states of the obstacle and the vehicle.

Further, the vehicle height adjustment is performed in a case where there is control to avoid the obstacle based on the determination result by the determination unit 30. In the case where the control method does not exist, the indicator 15 and the alarm 16 notify the driver that the obstacle that is unavoidable by the vehicle height adjustment control is present.

In this manner, in the case where it is not possible to avoid the obstacle, it is possible to cause the driver to recognize the presence of the obstacle unavoidable by the vehicle-height adjustment. Therefore, the driver is able to take action so as to avoid the contact of the obstacle with the vehicle, by turning the steering wheel so as to avoid the obstacle by the decision of the driver, stepping on the brake, or the like. In addition, the vehicle height adjustment is performed only in a case where it is possible to avoid the obstacle, and thereby the control does not start or is not continued when it is not possible to avoid the obstacle. Therefore, it is possible to prevent the steering stability from being degraded due to unnecessary control.

Other Embodiments

The embodiment described above has a configuration in which the camera 11, the sensors 12 to 14, the indicator 15, the alarm 16, and the light source 18 are electrically connected to the ECU 17; however, there is no need to directly connect the camera 11, the sensors 12 to 14, the indicator 15, the alarm 16, and the light source 18 to the ECU 17, and the detection result may be acquired by the in-vehicle network that is represented by a controller area network (CAN).

In the embodiment described above, the vehicle-height adjusting device is not limited to the air spring as long as it is a fluid spring. Regarding the fluid spring, similar to the embodiment described above, it is possible to detect the fluid pressure in the vehicle-height adjusting device, and it is possible to calculate the vehicle-height adjustment speed.

In the embodiment described above, the performance or non-performance of the control and the control time are determined from the detection result of the obstacle, and the state of vehicle however, the one-side two-wheel simultaneous control of the right and left wheels is acquired, based on the position information of the obstacle, and the driving path of the vehicle. In this case, since the control is performed on the identification result of the portion of the vehicle that overlaps the obstacle, and there is no need to consider the control speed, the vehicle-height adjusting device is not limited to the one using the fluid.

In the embodiment described above, the obstacle detecting unit is not limited to the combination of the camera and the light source as long as it is possible to analyze the height of the obstacle and the position with respect to the vehicle. In addition, the obstacle detecting unit may also be provided in a portion other than the front side of the vehicle as necessary.

In the embodiment described above, the driving path is calculated from the steering angle and the speed of the vehicle; however, in a case where the vehicle has a function of driving along the predetermined driving path (self-driving, driving support function, or the like), the determined driving path is acquired, the portion of the vehicle that overlaps the obstacle is identified, based on the acquired driving path, and thereby it is possible to reduce the calculation load. In addition, it is possible to identify the portion of the vehicle that overlaps the obstacle with high accuracy, compared to a case of using the driving path calculated from the steering angle and the speed of the vehicle. It is possible to determine the control time with high accuracy because the correction of the driving path is reduced, compared to the case where the driving path is calculated, based on a value such as the steering angle or the speed of the vehicle that is likely to change.

In the embodiment described above, the vehicle-height adjustment speed is calculated with the premise of a case where the compressor and motor 44 is driven; however, it is possible to set the control speed in both patterns of actuation or non-actuation of the compressor of the lifting method during the lifting of the air suspension. In this case, the calculation of the patterns of the actuation or non-actuation of the compressor is added to the calculation of the vehicle-height adjustment speed of the embodiment described above.

In the embodiment described above, it is possible to perform the same control of not only the obstacle on the ground, but also an obstacle in the air. In this case, the contact amount is calculated from a difference between a height of the obstacle from the ground, which is detected in the air, and a height of the top of the vehicle so that contact avoiding determination is performed. In this manner, it is possible to avoid the obstacle in the air.

In the embodiment described above, a risk is notified in a case where there is a possibility of contact, to the CPU that performs determination related to the driving such as the self-driving or the driving support instead of the driver, and thereby it is possible to cause the CPU that performs the determination related to the driving to recognize the presence of the obstacle that is unavoidable by control. In this manner, in a case where the CPU functions as the self-driving or the driving support, it is also possible to achieve the same effects as those in the case where the driver drives the vehicle.

In the embodiment described above, a risk is notified in a case where there is a possibility of contact, to the CPU that performs brake control, and thereby it is possible to cause the CPU that performs the brake control to perform braking and it is possible to avoid the contact with the obstacle.

In the embodiment described above, when the obstacle is not present, the vehicle-height adjusting device may maintain the height of the vehicle in a low state. After determination that the avoidance of the obstacle is performed, the vehicle height is in the low state. In this manner, it is possible to prevent the state in which the steering stability is degraded from continuing as the vehicle height is maintained to be high after the avoidance of the obstacle.

In the embodiment described above, after the four-wheel simultaneous control is performed, the one-side two-wheel simultaneous control is performed as the vehicle-height adjusting control to the extent that the vehicle avoids the obstacle, however, the control is not particularly limited thereto, and, for example, only one wheel may be controlled so as to avoid the obstacle.

As described above, the specific configuration described in the embodiments described above are only an example of this disclosure, this disclosure is not limited to the specific configuration, and it is possible to employ various types of aspects within a range without departing from the gist of this disclosure.

A first aspect of this disclosure is directed to a vehicle-height adjusting device including: a vehicle-height adjusting unit that adjusts a vehicle height through extension and contraction thereof, which is disposed between each wheel and a vehicle body of a vehicle; a control unit that controls actuation of the vehicle-height adjusting unit; an obstacle detecting unit that detects an obstacle that is present within a predetermined range from the vehicle; a steering-angle detecting unit that detects an steering angle of the vehicle; and an identification unit that identifies a portion of the vehicle that overlaps the obstacle, based on a detection result by the obstacle detecting unit and a detection result by the steering-angle detecting unit. The control unit controls at least one of the vehicle-height adjusting units, based on an identification result of the identification unit.

With this configuration, in a case where the obstacle is present within the predetermined range from the vehicle, the identification unit identifies the portion of the vehicle that overlaps the obstacle, based on the detection results by the obstacle detecting unit and the steering-angle detecting unit, respectively. Then, the control unit actuates the vehicle-height adjusting unit so as to adjust the vehicle height, based on the identification result by the identification unit.

In a second aspect of this disclosure, the vehicle-height adjusting device further includes: a vehicle-speed detecting unit that detects a vehicle speed of the vehicle; and a driving-path calculating unit that calculates a driving path of the vehicle, based on detection results by the steering-angle detecting unit and the vehicle-speed detecting unit. The identification unit identifies a portion of the vehicle that overlaps the obstacle, based on the detection result by the obstacle detecting unit and a calculation result by the driving-path calculating unit.

With this configuration, the driving-path calculating unit calculates the driving path of the vehicle, based on the detection results by the steering-angle detecting unit and the vehicle-speed detecting unit, respectively. The identification unit identifies the portion of the vehicle that overlaps the obstacle, based on the detection result by the obstacle detecting unit and the calculation result by the driving-path calculating unit.

In a third aspect of this disclosure, the vehicle-height adjusting device further includes: a displacement-amount detecting unit that detects a displacement amount of the vehicle-height adjusting unit; a ground-clearance calculating unit that calculates ground clearance of a bottom of the vehicle in a portion of the vehicle that overlaps the obstacle, based on the identification result by the identification unit and a detection result by the displacement-amount detecting unit; an obstacle-height calculating unit that calculates a height of the obstacle, based on the detection result by the obstacle detecting unit; and a contact-amount calculating unit that calculates a contact amount between the vehicle and the obstacle in a portion of the vehicle that overlaps the obstacle, based on a calculation result by the ground-clearance calculating unit and a calculation result by the obstacle-height calculating unit. The control unit controls at least one of the vehicle-height adjusting units, based on a calculation result by the contact-amount calculating unit.

With this configuration, the ground-clearance calculating unit calculates the ground clearance of the bottom of the vehicle in the portion of the vehicle that overlaps the obstacle, based on the identification result by the identification unit and the detection result by the displacement-amount detecting unit, and the obstacle-height calculating unit calculates the height of the obstacle, based on the detection result by the obstacle detecting unit. The contact-amount calculating unit calculates the contact amount between the vehicle and the obstacle in the portion of the vehicle that overlaps the obstacle, based on the calculation result by the ground-clearance calculating unit and the calculation result by the obstacle-height calculating unit. The control unit actuates the vehicle-height adjusting unit so as to adjust the vehicle height, based on the calculation result by the contact-amount calculating unit.

In a fourth aspect of this disclosure, the vehicle-height adjusting unit adjusts the vehicle height by using an air spring, the vehicle-height adjusting device further including: a displacement-amount detecting unit that detects a displacement amount of the vehicle-height adjusting unit; a ground-clearance calculating unit that calculates ground clearance of a bottom of the vehicle in a portion of the vehicle that overlaps the obstacle, based on the identification result by the identification unit and a detection result by the displacement-amount detecting unit; an obstacle-height calculating unit that calculates a height of the obstacle, based on the detection result by the obstacle detecting unit; a contact-amount calculating unit that calculates a contact amount between the vehicle and the obstacle in a portion of the vehicle that overlaps the obstacle, based on the calculation result by the ground-clearance calculating unit and a calculation result by the obstacle-height calculating unit; a pressure detecting unit that detects a pressure in the air spring; an actuation-speed calculating unit that calculates a speed depending on the extension and contraction of the vehicle-height adjusting unit, based on a detection result by the pressure detecting unit; a vehicle-bottom lifting-speed calculating unit that calculates a lifting speed of the bottom of the vehicle in a portion of the vehicle that overlaps the obstacle, based on the identification result by the identification unit and a calculation result by the actuation-speed calculating unit; an obstacle-position calculating unit that calculates a relative position of the obstacle from the vehicle, based on the detection result by the obstacle detecting unit; a reaching-time calculating unit that calculates time taken for the foremost portion of the vehicle to reach the obstacle, based on the identification result by the identification unit, the detection result by the vehicle-speed detecting unit, the calculation result by the driving-path calculating unit, and a calculation result by the obstacle-position calculating unit; a control determining unit that determines a control method of the vehicle-height adjusting unit, based on the calculation result by the contact-amount calculating unit, a calculation result by the vehicle-bottom lifting-speed calculating unit, and a calculation result by the reaching-time calculating unit; and a determination unit that determines whether or not it is possible to avoid contact between the vehicle and the obstacle, based on a determination result by the control determining unit. In a case where the determination unit determines that it is possible to avoid the contact between the vehicle and the obstacle, the control unit controls at least one of the vehicle-height adjusting units, based on the control method determined by the control determining unit.

With this configuration, the driving-path calculating unit calculates the driving path of the vehicle, based on the detection results by the steering-angle detecting unit and the vehicle-speed detecting unit, respectively. The identification unit identifies the portion of the vehicle that overlaps the obstacle, based on the detection result by the obstacle detecting unit and the calculation result by the driving-path calculating unit. The vehicle-height adjusting unit adjusts the vehicle height by using an air spring. The displacement-amount detecting unit detects the displacement amount of the vehicle-height adjusting unit, and the ground-clearance calculating unit calculates the ground clearance of the bottom of the vehicle, based on the identification result by the identification unit and the detection result by the displacement-amount detecting unit. The obstacle-height calculating unit calculates the height of the obstacle, based on the detection result by the obstacle detecting unit, and the contact-amount calculating unit calculates the contact amount between the vehicle and the obstacle in the portion of the vehicle that overlaps the obstacle, based on the calculation results by the ground-clearance calculating unit and the obstacle-height calculating unit, respectively. The actuation-speed calculating unit calculates the speed depending on the extension and contraction of the vehicle-height adjusting unit, based on the detection result by the pressure detecting unit, and the vehicle-bottom lifting-speed calculating unit calculates the lifting speed of the bottom of the vehicle in the portion of the vehicle that overlaps the obstacle, based on the identification result by the identification unit and the calculation result by the actuation-speed calculating unit. The obstacle-position calculating unit calculates the relative position of the obstacle from the vehicle, based on the detection result by the obstacle detecting unit, and the reaching-time calculating unit calculates time taken for the foremost portion of the vehicle to reach the obstacle, based on the identification result by the identification unit, the detection result by the vehicle-speed detecting unit, the calculation result by the driving-path calculating unit, and the calculation result by the obstacle-position calculating unit.

The control determining unit determines the control method of the vehicle-height adjusting unit, based on the calculation result by the contact-amount calculating unit, the calculation result by the vehicle-bottom lifting-speed calculating unit, and the calculation result by the reaching-time calculating unit. The determination unit determines whether or not it is possible to avoid contact between the vehicle and the obstacle, based on the determination result by the control determining unit. In the case where the determination unit determines that it is possible to avoid the contact between the vehicle and the obstacle, the control unit actuates the vehicle-height adjusting unit so as to adjust the vehicle height, based on the control method determined by the control determining unit.

In a fifth aspect of this disclosure, the vehicle-height adjusting device further includes: a notifying unit that notifies a driver of the vehicle that it is not possible to avoid the obstacle by the control of the air spring, in a case where the determination unit determines that it is not possible to avoid the contact between the vehicle and the obstacle.

With this configuration, the notifying unit notifies the driver of the vehicle that it is not possible to avoid the obstacle with the control of the air spring, in the case where the determination unit determines that it is not possible to avoid the contact between the vehicle and the obstacle.

According to the first aspect of this disclosure, it is possible to perform more appropriate vehicle-height adjusting control than the related art.

According to the second aspect of this disclosure, more accurate identification result is acquired from the identification unit, and thus it is possible to perform more appropriate vehicle-height adjusting control.

According to the third aspect of this disclosure, more accurate target value of the vehicle-height adjustment is acquired, and thus it is possible to perform more appropriate vehicle-height adjusting control.

According to the fourth aspect of this disclosure, it is possible to perform more appropriate vehicle-height adjusting control of a state between the obstacle and the vehicle.

According to the fifth aspect of this disclosure, it is possible for the driver to recognize that there is an obstacle that is unavoidable by the vehicle-height adjustment.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle-height adjusting device comprising:
a vehicle-height adjusting unit that adjusts a vehicle height through extension and contraction thereof, which is disposed between each wheel and a vehicle body of a vehicle;
a control unit that controls actuation of the vehicle-height adjusting unit;
an obstacle detecting unit that detects an obstacle that is present within a predetermined range from the vehicle;
a steering-angle detecting unit that detects a steering angle of the vehicle;
an identification unit that identifies a portion of the vehicle that overlaps the obstacle, based on a detection result by the obstacle detecting unit and a detection result by the steering-angle detecting unit;
a displacement-amount detecting unit that detects a displacement amount of the vehicle-height adjusting unit;
a ground-clearance calculating unit that calculates ground clearance of a bottom of the vehicle in a portion of the vehicle that overlaps the obstacle, based on an identification result by the identification unit and a detection result by the displacement-amount detecting unit;
an obstacle-height calculating unit that calculates a height of the obstacle, based on the detection result by the obstacle detecting unit; and
a contact-amount calculating unit that calculates a contact amount between the vehicle and the obstacle in a portion of the vehicle that overlaps the obstacle, based on a calculation result by the ground-clearance calculating unit and a calculation result by the obstacle-height calculating unit,
wherein the control unit controls at least one of the vehicle-height adjusting units, based on the identification result of the identification unit and based on a calculation result by the contact-amount calculating unit.

2. The vehicle-height adjusting device according to claim 1, further comprising:
a vehicle-speed detecting unit that detects a vehicle speed of the vehicle; and
a driving-path calculating unit that calculates a driving path of the vehicle, based on detection results by the steering-angle detecting unit and the vehicle-speed detecting unit,
wherein the identification unit identifies a portion of the vehicle that overlaps the obstacle, based on the detection result by the obstacle detecting unit and a calculation result by the driving-path calculating unit.

3. A vehicle-height adjusting device comprising:
a vehicle-height adjusting unit that adjusts a vehicle height through extension and contraction thereof, which is disposed between each wheel and a vehicle body of a vehicle, wherein the vehicle-height adjusting unit adjusts the vehicle height by using an air spring; a control unit that controls actuation of the vehicle-height adjusting unit;
an obstacle detecting unit that detects an obstacle that is present within a predetermined range from the vehicle;
a steering-angle detecting unit that detects a steering angle of the vehicle; and
an identification unit that identifies a portion of the vehicle that overlaps the obstacle, based on a detection result by the obstacle detecting unit and a detection result by the steering-angle detecting unit;
a vehicle-speed detecting unit that detects a vehicle speed of the vehicle;
a driving-path calculating unit that calculates a driving path of the vehicle, based on detection results by the steering-angle detecting unit and the vehicle-speed detecting unit;
a displacement-amount detecting unit that detects a displacement amount of the vehicle-height adjusting unit;
a ground-clearance calculating unit that calculates ground clearance of a bottom of the vehicle in a portion of the vehicle that overlaps the obstacle, based on an identification result by the identification unit and a detection result by the displacement-amount detecting unit;
an obstacle-height calculating unit that calculates a height of the obstacle, based on the detection result by the obstacle detecting unit;
a contact-amount calculating unit that calculates a contact amount between the vehicle and the obstacle in a portion of the vehicle that overlaps the obstacle, based on a calculation result by the ground-clearance calculating unit and a calculation result by the obstacle-height calculating unit;
a pressure detecting unit that detects a pressure in the air spring;
an actuation-speed calculating unit that calculates a speed depending on the extension and contraction of the vehicle-height adjusting unit, based on a detection result by the pressure detecting unit;
a vehicle-bottom lifting-speed calculating unit that calculates a lifting speed of the bottom of the vehicle in a portion of the vehicle that overlaps the obstacle, based on the identification result by the identification unit and a calculation result by the actuation-speed calculating unit;
an obstacle-position calculating unit that calculates a relative position of the obstacle from the vehicle, based on the detection result by the obstacle detecting unit;
a reaching-time calculating unit that calculates time taken for the foremost portion of the vehicle to reach the obstacle, based on the identification result by the identification unit, the detection result by the vehicle-speed detecting unit, the calculation result by the driving-path calculating unit, and a calculation result by the obstacle-position calculating unit;
a control determining unit that determines a control method of the vehicle-height adjusting unit, based on the calculation result by the contact-amount calculating unit, a calculation result by the vehicle-bottom lifting-speed calculating unit, and a calculation result by the reaching-time calculating unit; and
a determination unit that determines whether or not it is possible to avoid contact between the vehicle and the obstacle, based on a determination result by the control determining unit,
wherein the control unit controls at least one of the vehicle-height adjusting unit, based on an identification result of the identification unit,
wherein the identification unit identifies a portion of the vehicle that overlaps the obstacle, based on the detection result by the obstacle detecting unit and a calculation result by the driving-path calculating unit, and
wherein, in a case where the determination unit determines that it is possible to avoid the contact between the vehicle and the obstacle, the control unit controls at least one of the vehicle-height adjusting units, based on the control method determined by the control determining unit.

4. The vehicle-height adjusting device according to claim 3, further comprising:

a notifying unit that notifies a driver of the vehicle that it is not possible to avoid the obstacle with the control of the air spring, in a case where the determination unit determines that it is not possible to avoid the contact between the vehicle and the obstacle.

* * * * *